US012663089B2

(12) United States Patent
Mitri et al.

(10) Patent No.: US 12,663,089 B2
(45) Date of Patent: Jun. 23, 2026

(54) MULTI-WAY VALVE

(71) Applicant: Stant USA Corp., Connersville, IN (US)

(72) Inventors: George J. Mitri, Connersville, IN (US); Michael S. Brock, Connersville, IN (US); Chun Li, Suzhou (CN); Wenbo Zhao, Suzhou (CN)

(73) Assignee: Stant USA Corp., Connersville, IN (US)

( * ) Notice: Subject to any disclaimer, the term of this patent is extended or adjusted under 35 U.S.C. 154(b) by 70 days.

(21) Appl. No.: 18/430,307

(22) Filed: Feb. 1, 2024

(65) Prior Publication Data

US 2024/0263709 A1 Aug. 8, 2024

Related U.S. Application Data

(60) Provisional application No. 63/443,029, filed on Feb. 2, 2023.

(51) Int. Cl.
F16K 11/074 (2006.01)
F01P 7/14 (2006.01)
F16K 3/10 (2006.01)

(52) U.S. Cl.
CPC ............ F16K 11/0743 (2013.01); F16K 3/10 (2013.01); *F01P 2007/146* (2013.01)

(58) Field of Classification Search
CPC ...... F16K 11/0743; F16K 27/045; F16K 3/10; F01P 2007/146; F01P 7/14
See application file for complete search history.

(56) References Cited

U.S. PATENT DOCUMENTS

| 2,202,961 | A | * | 6/1940 | Parker | F16K 3/10 |
| | | | | | 137/881 |
| 2,209,991 | A | * | 8/1940 | Mcgill | F16K 11/0743 |
| | | | | | 251/159 |
| 2,209,992 | A | * | 8/1940 | Mcgill | F16K 3/10 |
| | | | | | 137/625.29 |
| 2,209,993 | A | * | 8/1940 | Mcgill | F16K 11/0743 |
| | | | | | 137/625.29 |
| 2,253,020 | A | * | 8/1941 | Daniels | F16K 3/10 |
| | | | | | 137/625.29 |
| 2,610,511 | A | * | 9/1952 | Mansen | F16K 11/0743 |
| | | | | | 74/89.45 |

(Continued)

FOREIGN PATENT DOCUMENTS

| CN | 204610957 U | 9/2015 |
| CN | 107893865 A | 4/2018 |

(Continued)

OTHER PUBLICATIONS

European Search Report for Application No. EP24153838, dated Jun. 10, 2024, 11 pages.

*Primary Examiner* — David Colon-Morales
(74) *Attorney, Agent, or Firm* — Barnes & Thornburg

(57) ABSTRACT

A multi-way valve adapted to control a flow of fluid to different thermal fluid circuits includes a valve housing, a valve flow controller, and a scaling system. The valve flow controller is arranged in the valve housing to control flow through the valve housing. The scaling system is configured to seal between the valve housing and the valve flow controller.

18 Claims, 17 Drawing Sheets

(56) References Cited

U.S. PATENT DOCUMENTS

| | | | | |
|---|---|---|---|---|
| 2,644,484 A * | 7/1953 | Mansen | ..................... | F16K 3/10 |
| | | | | 137/881 |
| 2,777,515 A * | 1/1957 | Stirling | ............... | F16K 11/0743 |
| | | | | 251/162 |
| 3,146,794 A * | 9/1964 | Hollman | ............. | F16K 11/0743 |
| | | | | 137/625.3 |
| 3,251,408 A | 5/1966 | Henry et al. | | |
| 3,927,693 A | 12/1975 | Johnston | | |
| 4,216,798 A * | 8/1980 | Tscherner | ........... | F16K 11/0743 |
| | | | | 137/625.46 |
| 4,429,717 A | 2/1984 | Montgomery | | |
| 4,674,538 A * | 6/1987 | Yes | ..................... | F16K 11/0743 |
| | | | | 137/625.46 |
| 5,377,718 A * | 1/1995 | Sand | ................... | F16K 11/0743 |
| | | | | 137/893 |
| 5,431,189 A | 7/1995 | Jones | | |
| 5,529,758 A | 6/1996 | Houston | | |
| 5,950,576 A * | 9/1999 | Busato | ...................... | F01P 7/16 |
| | | | | 137/625.46 |
| 6,186,174 B1 * | 2/2001 | Yurchision | ............... | F16K 3/10 |
| | | | | 137/625.46 |
| 6,193,213 B1 * | 2/2001 | Stearns | ................... | F16K 3/188 |
| | | | | 137/625.46 |
| 6,245,233 B1 | 6/2001 | Lu | | |
| 6,347,644 B1 | 2/2002 | Channell | | |
| 8,336,319 B2 | 12/2012 | Johnston et al. | | |
| 8,375,990 B2 | 2/2013 | Veros | | |
| 8,402,776 B2 | 3/2013 | Johnston et al. | | |
| 8,448,696 B2 | 5/2013 | Johnston et al. | | |
| 9,777,469 B2 | 10/2017 | Wang | | |
| 10,344,877 B2 | 7/2019 | Roche et al. | | |
| 10,665,908 B2 | 5/2020 | Krull et al. | | |
| 10,851,901 B2 | 12/2020 | Liberman et al. | | |
| 10,967,702 B2 | 4/2021 | Mancini et al. | | |
| 11,084,404 B2 | 8/2021 | Gupta et al. | | |
| 11,168,797 B2 | 11/2021 | Dragojlov et al. | | |
| 11,175,265 B2 * | 11/2021 | Stearns | .................. | G01N 30/20 |
| 11,247,529 B2 | 2/2022 | Zhou et al. | | |
| 11,383,578 B2 | 7/2022 | Huang et al. | | |
| 11,572,957 B2 * | 2/2023 | Chapman | ............ | F16K 11/0743 |
| 11,585,451 B2 * | 2/2023 | Chapman | ............ | F16K 11/0743 |
| 2006/0118066 A1 | 6/2006 | Martins | | |
| 2006/0231146 A1 | 10/2006 | Lillback | | |
| 2008/0223464 A1 | 9/2008 | Merrell | | |
| 2010/0319796 A1 | 12/2010 | Whitaker | | |
| 2014/0053931 A1 | 2/2014 | Whitaker | | |
| 2014/0090414 A1 | 4/2014 | Mclane et al. | | |
| 2015/0354716 A1 | 12/2015 | Morein | | |
| 2017/0089474 A1 | 3/2017 | Zhan et al. | | |
| 2019/0039440 A1 | 2/2019 | Calderone | | |
| 2020/0011437 A1 | 1/2020 | Lin et al. | | |
| 2021/0331554 A1 | 10/2021 | Mancini et al. | | |
| 2022/0146003 A1 | 5/2022 | Yu et al. | | |
| 2022/0390026 A1 | 12/2022 | Chapman | | |
| 2024/0183456 A1 * | 6/2024 | Bachofer | ............ | F16K 11/0743 |

FOREIGN PATENT DOCUMENTS

| | | | | | |
|---|---|---|---|---|---|
| CN | 106090315 B | | 8/2018 | | |
| CN | 112682541 A | | 4/2021 | | |
| CN | 214743520 U | | 11/2021 | | |
| CN | 214946603 U | | 11/2021 | | |
| CN | 214999563 U | | 12/2021 | | |
| CN | 215059741 U | | 12/2021 | | |
| CN | 215950468 U | | 3/2022 | | |
| CN | 114688306 A | | 7/2022 | | |
| CN | 217207877 U | | 8/2022 | | |
| CN | 217539713 U | | 10/2022 | | |
| CN | 114635991 B | | 3/2023 | | |
| CN | 220102162 A | | 11/2023 | | |
| CN | 220102162 U | * | 11/2023 | .......... | F16K 27/065 |
| CN | 221780053 U | | 9/2024 | | |
| DE | 10153222 B4 | | 7/2012 | | |
| DE | 202014102795 U1 | * | 6/2014 | .......... | F16K 11/0743 |
| DE | 102021101096 A1 | | 7/2022 | | |
| ES | 1085929 U | * | 7/2013 | .............. | F16K 3/10 |
| JP | 11044369 A | * | 2/1999 | | |
| JP | H1144369 A | * | 2/1999 | | |
| JP | 2002022041 A | * | 1/2002 | | |
| JP | 3947817 B2 | * | 7/2007 | | |
| WO | 2022057588 A1 | | 3/2022 | | |
| WO | WO-2022258383 A1 | * | 12/2022 | .......... | F16K 11/0743 |

* cited by examiner

THERMAL FLUID CIRCUITS

*See Fig. 8*

| MODE | LOOP 1 | LOOP 2 | BLOCKED |
|---|---|---|---|
| A | 5 → 3 | 1 → 2 | 4 |
| B | 4 → 3 | 1 → 2 | 5 |
| C | 5+4 → 3 | 1 → 2 | |
| D | 5 → 1 | 3 → 2 | 4 |
| E | 4 → 1 | 3 → 2 | 5 |
| F | 5+4 → 1 | 3 → 2 | |

*FIG. 9*

MULTI-WAY VALVE
(MODE E)

VALVE ROTOR
(FIFTH POSITION)

THERMAL FLUID CIRCUITS

MULTI-WAY VALVE

PRIORITY CLAIM

This application claims priority to and the benefit of U.S. Provisional Patent Application No. 63/443,029, filed 2 Feb. 2023, the disclosure of which is now expressly incorporated herein by reference.

TECHNICAL FIELD

The present disclosure relates to multi-way valves, and particularly to multi-way valves for controlling the flow of heating and/or cooling fluid to various thermal fluid circuits in a vehicle. More particularly, the present disclosure relates to an electro mechanical multi-way valve.

BACKGROUND

Multi-way valves are used for controlling the flow of fluid to various thermal fluid circuits in a vehicle. However, there is a need for multi-way valves with an increased number of possible flow paths and improved sealing.

SUMMARY

The present disclosure provides a multi-way valve that controls the flow of heating and/or cooling fluid to different thermal fluid circuits in a vehicle with improved sealing. The multi-way valve may include a valve housing and a valve flow controller positioned in the housing to control the flow of fluid through the valve housing. The flow of heating and/or cooling fluid may be controlled to direct fluid to different thermal fluid circuits in a vehicle.

According to an aspect of the present application, the valve housing may include a valve housing body coupled to a manifold of the thermal fluid circuits and a housing cover. The valve housing body may be shaped to define a valve cavity and a plurality of apertures that open into the valve cavity. The housing cover may be coupled to the second end of the valve housing to close a second end opening to the valve cavity.

According to an aspect of the present application, the valve flow controller may include a valve rotor arranged in the valve cavity of the valve housing body. The valve rotor may be configured to rotate relative to the valve housing body about a valve axis. The valve rotor may cooperate with the valve housing to define a plurality of flow paths in the valve housing when the valve rotor is rotated about the valve axis to control the flow of fluid through the valve housing.

With the multi-way valve of the present disclosure, a multi-way valve with an increased number of flow paths and improved sealing is provided. The valve rotor provides the increased number of flow paths, while the seal is coupled for rotation therewith. This arrangement improves sealing between the apertures in the valve housing body not only because the flow path is less complicated, but the sealing system also uses less material for the seals and reduces the friction on the first valve rotor.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective diagrammatic view of a multi-way valve configured to control the flow of fluid to various thermal fluid circuits in a vehicle;

FIG. 2 is an exploded view of the multi-way valve of FIG. 1 showing the multi-way valve includes a valve housing having a valve housing body that defines a valve cavity and a housing cover configured to be coupled to the valve housing body to close a top opening of the valve cavity, a valve flow controller having a valve rotor configured to be arranged in the valve cavity of the valve housing, and a sealing system configured to seal between the valve housing and the valve rotor of the valve flow controller;

FIG. 3 is view similar to FIG. 2 showing a portion of the valve housing broken away to show the valve housing body includes a plurality of apertures that open in the valve cavity;

FIG. 4 is an exploded view of the valve housing body and the valve flow controller included in the multi-way valve of FIG. 3 showing the valve rotor includes a valve rotor body that extends circumferentially about the valve axis and a valve rotor shaft that extends axially from the valve rotor body, and further showing the sealing system includes a seal configured to be coupled to the valve rotor body for rotation therewith and a biasing assembly configured to be arranged over the valve rotor shaft to apply an axial force on the valve rotor to urge the seal toward the bottom surface of the valve housing body;

FIG. 9 is a table showing the different modes of the multi-way valve of FIG. 1 and the different flow paths created at each of the different modes A-F;

Figures 11, 12:
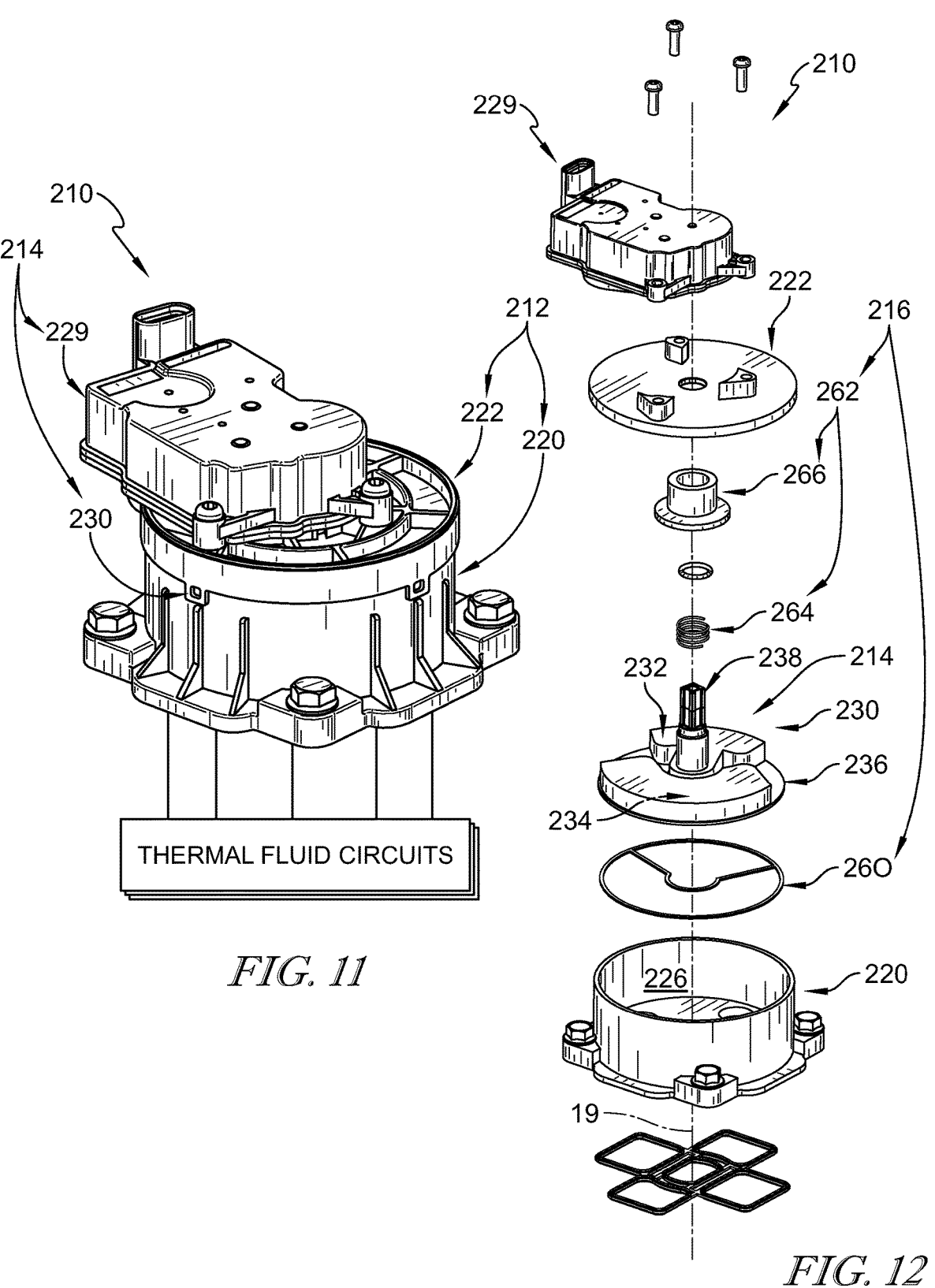
FIG. 11 is a perspective diagrammatic view of another embodiment of a multi-way valve.
Figure 13:
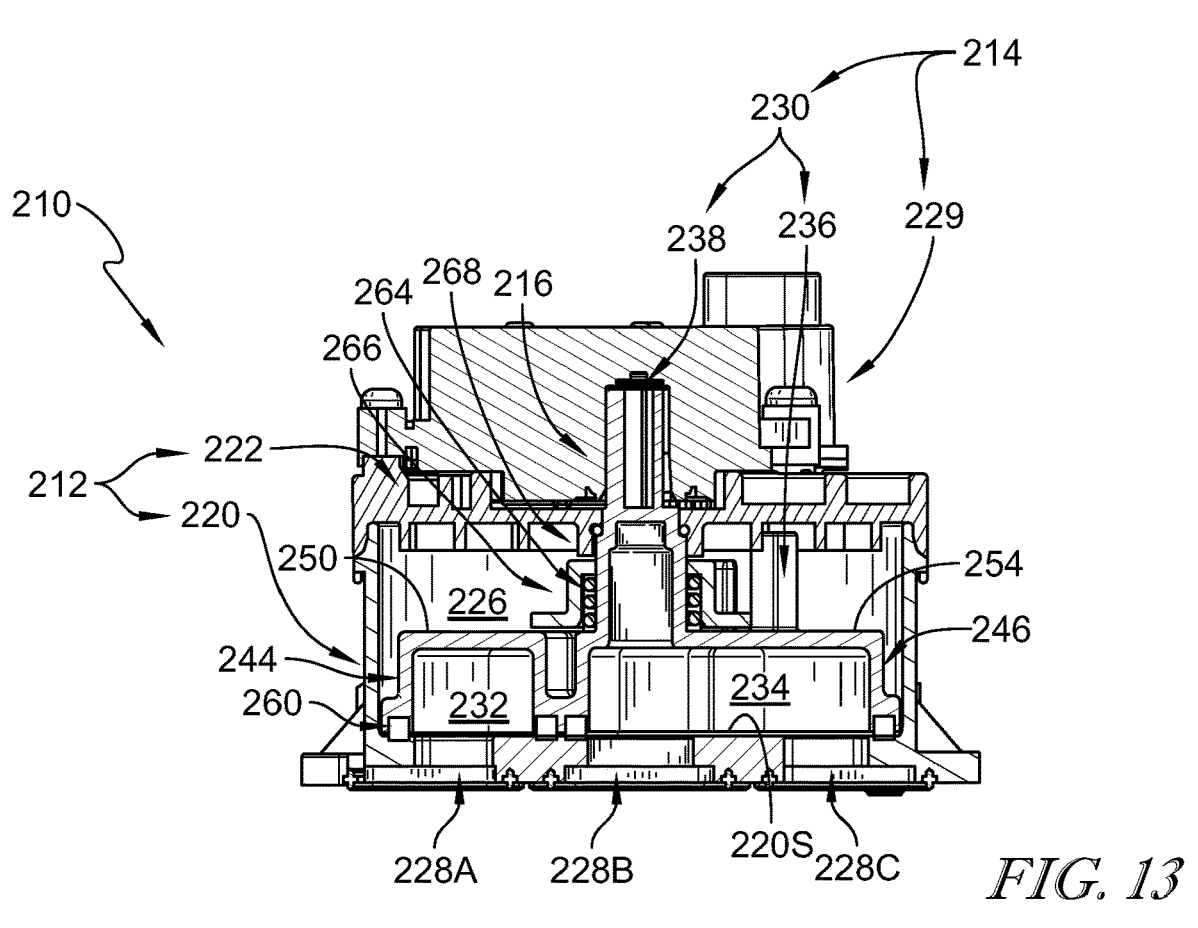
Figure 14:
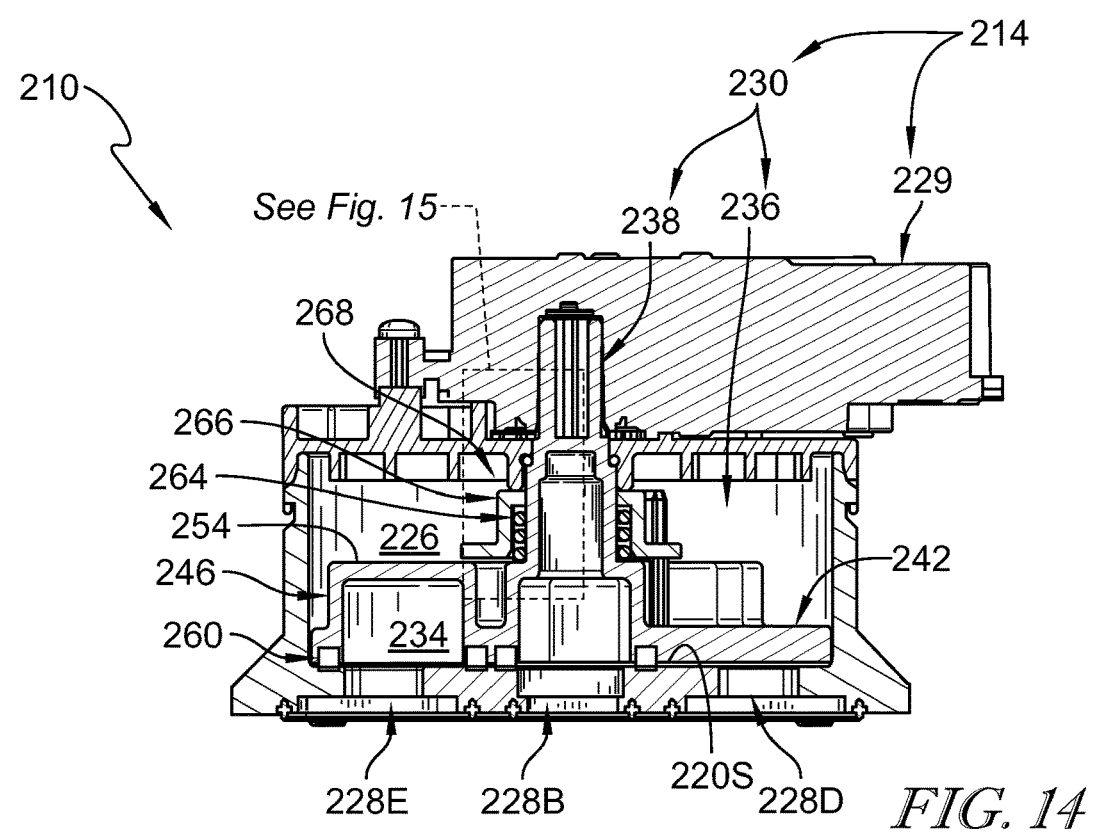
Figure 15:
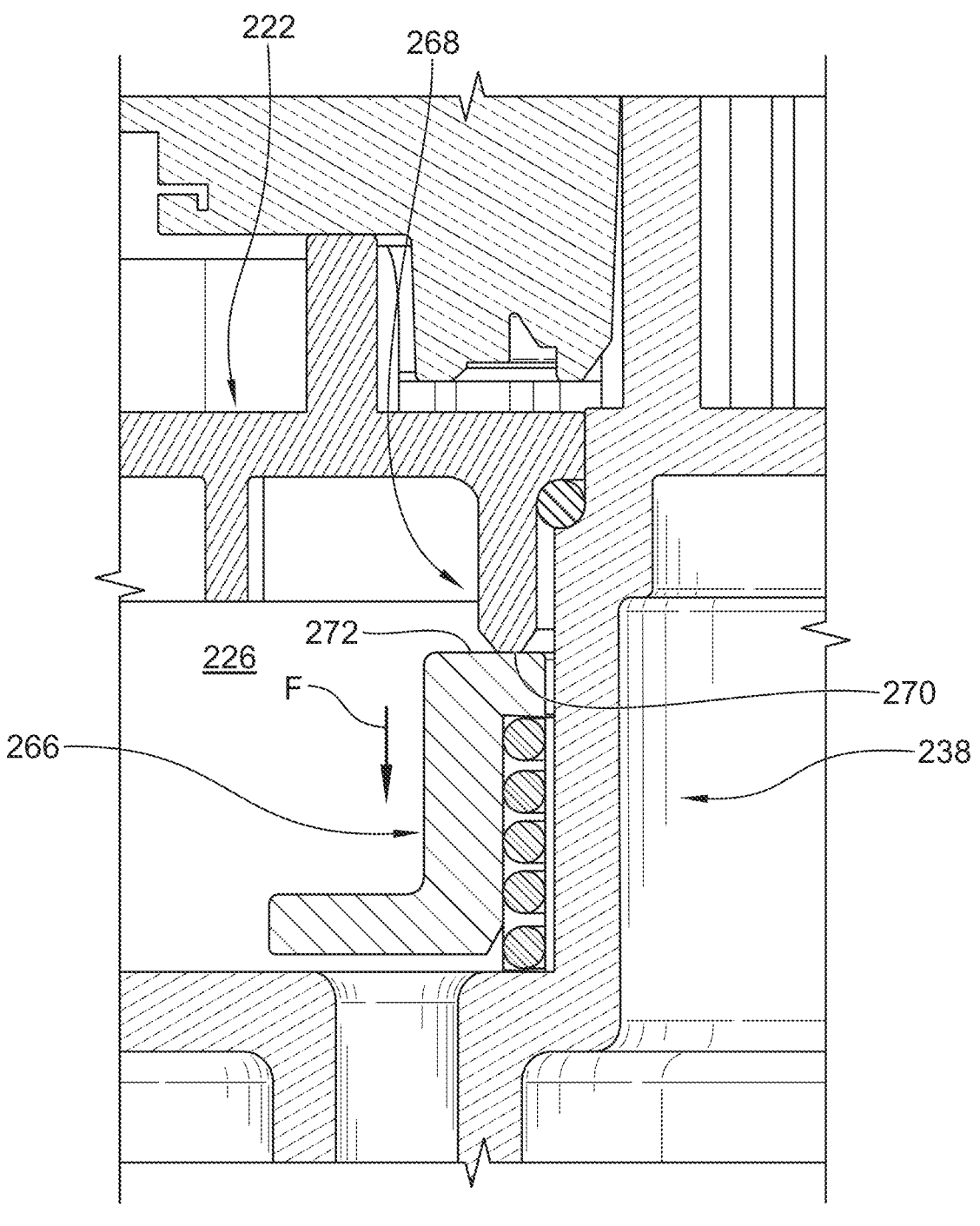

FIG. 12 is an exploded view of the multi-way valve of FIG. 11 showing the multi-way valve includes a valve housing, a valve flow controller having a valve rotor configured to be arranged in a valve cavity of the valve housing, and a sealing system configured to seal between the valve housing and the valve rotor of the valve flow controller, further showing the sealing system includes a seal and a biasing assembly having a bias spring and a spring cover;

FIG. 13 is a cross-section view of the multi-way valve of FIG. 11 showing valve rotor includes a valve rotor body shaped to define chambers that extend over the different apertures to fluidly connect the different apertures at the different predetermined positions;

FIG. 14 is a cross-section view of the multi-way valve of FIG. 11 showing valve rotor includes a valve rotor body may at least partially cover different apertures at the different predetermined positions; and FIG. 15 is a detail view of FIG. 14 showing the bias spring is arranged around a valve rotor shaft including in the valve rotor and the spring cover is arranged around the bias spring.

DETAILED DESCRIPTION

Figures 1, 2:
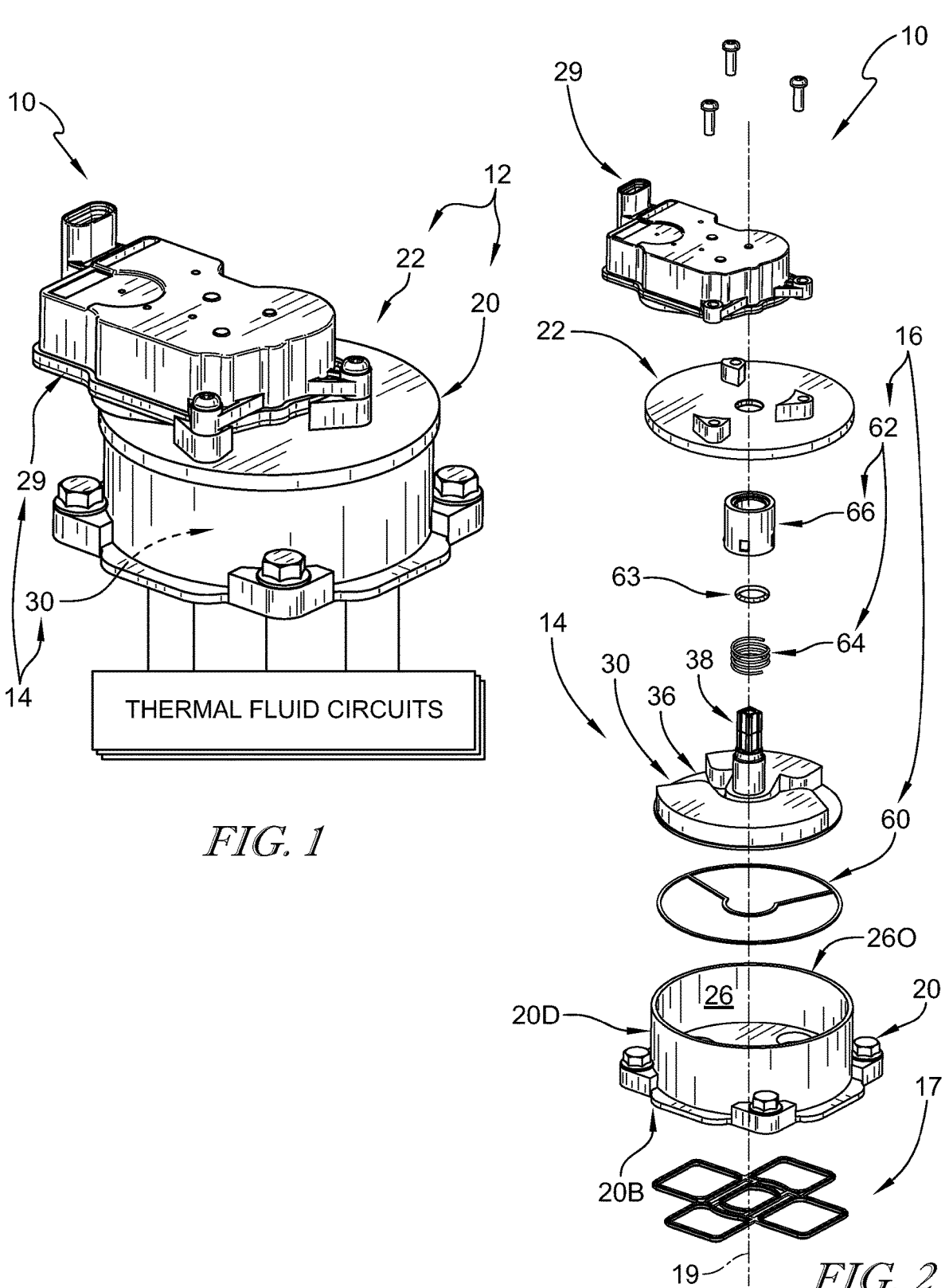

An illustrative multi-way valve 10 configured to control the flow of fluid to various thermal fluid circuits in a vehicle is shown in FIG. 1. The multi-way valve 10 includes a valve housing 12, a valve flow controller 14, and a sealing system 16. The valve flow controller 14 is arranged in the valve housing 12 to control flow through the valve housing 12. The sealing system 16 is configured to seal between the valve housing 12 and the valve flow controller 14.

Figure 3:
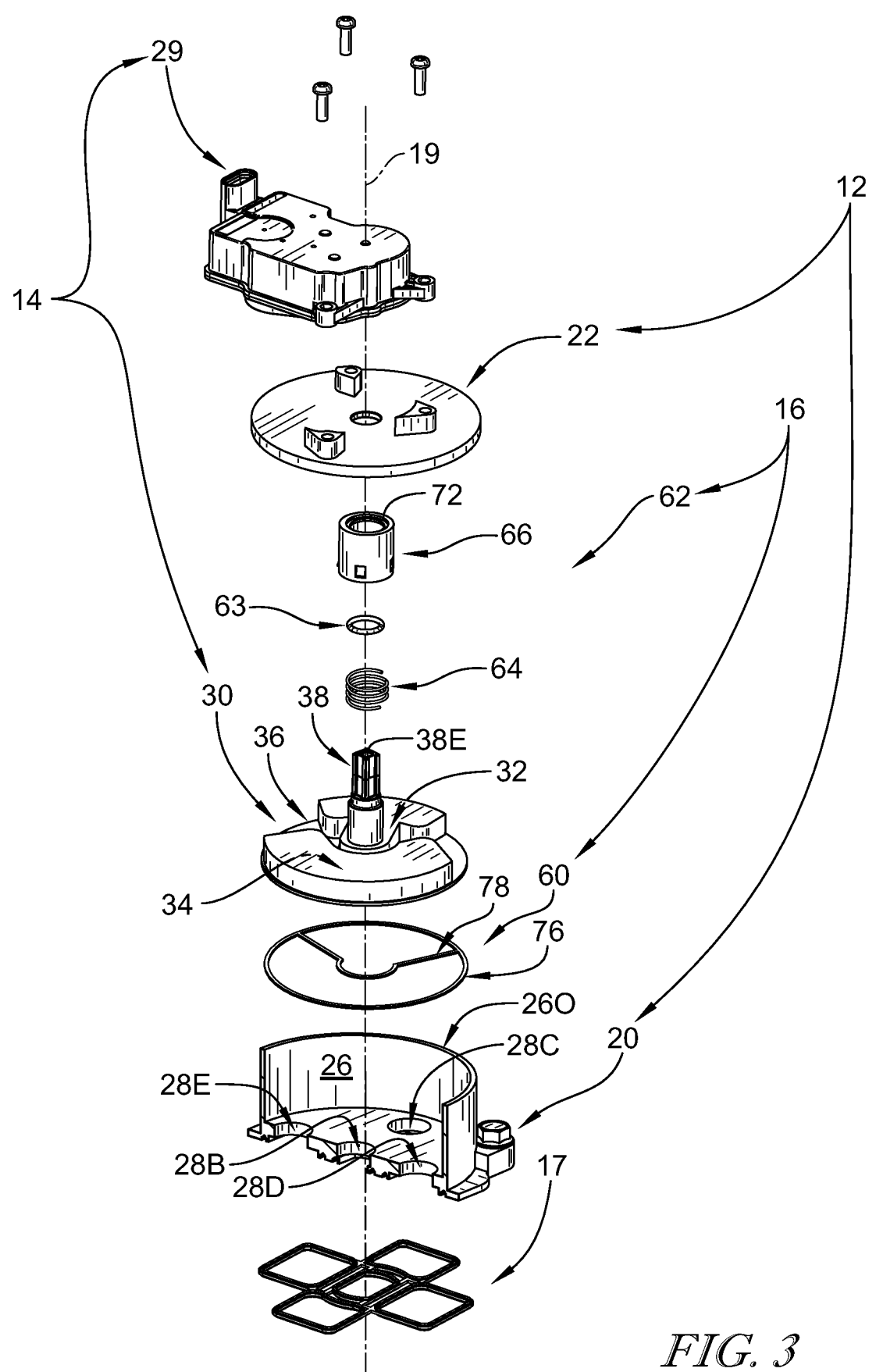

The valve flow controller 14 includes a valve rotor 30 arranged in a valve cavity 26 formed by the valve housing 12 and an actuator 29 as shown in FIGS. 2 and 3. The valve rotor 30 is configured to rotate relative to the valve housing 12 about a valve axis 19. The actuator 29 is coupled to the valve rotor 30 to drive rotation of the valve rotor 30.

The valve rotor 30 cooperates with the valve housing 12 to define a plurality of flow paths through the valve housing 12 as shown in FIGS. 9A-9F. As the valve rotor 30 is rotated about the valve axis 19 to different set positions as shown in FIGS. 9A-9F, the valve rotor 30 forms the different flow paths to control a flow of fluid through the valve housing 12 to different thermal fluid circuits.

The different modes of the multi-way valve 10 are shown in FIG. 9. The valve rotor 30 is in different predetermined positions in each of the different modes A-F to form the different flow paths through the valve housing 12. The multi-way valve 10 and/or the actuator 29 may include a control unit that is preprogrammed with the different modes A-F.

The arrangement and shape of the valve rotor 30 in the valve housing 12 reduces the overall size of the multi-way valve 10 compared to other multi-way valves and improves sealing between the valve rotor 30 and the valve housing 12. Other multi-way valves may have more complex passageways through the valve housing, which complicates sealing and increases the pressure drop as the fluid has to make more turns/changes direction more. The complex passageways may increase the potential for leaks across the different passageways. These valves may incorporate seals to seal between the passageways, but adding seals may require the actuator to have an increased torque capability to overcome the friction of the seals between the different components.

Moreover, adding more seals increases the overall manufacturing cost of the multi-way valve. Some valves may use a Teflon® or polytetrafluoroethylene (PTFE) material for the seals. This may make manufacturing a multi-way valve expensive, especially as other valves have complex passageways with large, complex seals that may need large amounts of Teflon® or polytetrafluoroethylene material.

The multi-way valve 10 of the present disclosure includes a single valve rotor 30 that cooperates with the valve housing 12 to form a plurality of flow paths. The arrangement of the valve rotor 30 reduces the amount of sealing material and improves sealing. Additionally, the arrangement of the valve rotor 30 reduces the contract surface area of the seal 60, thereby reducing the friction on the valve rotor 30.

Figure 4:
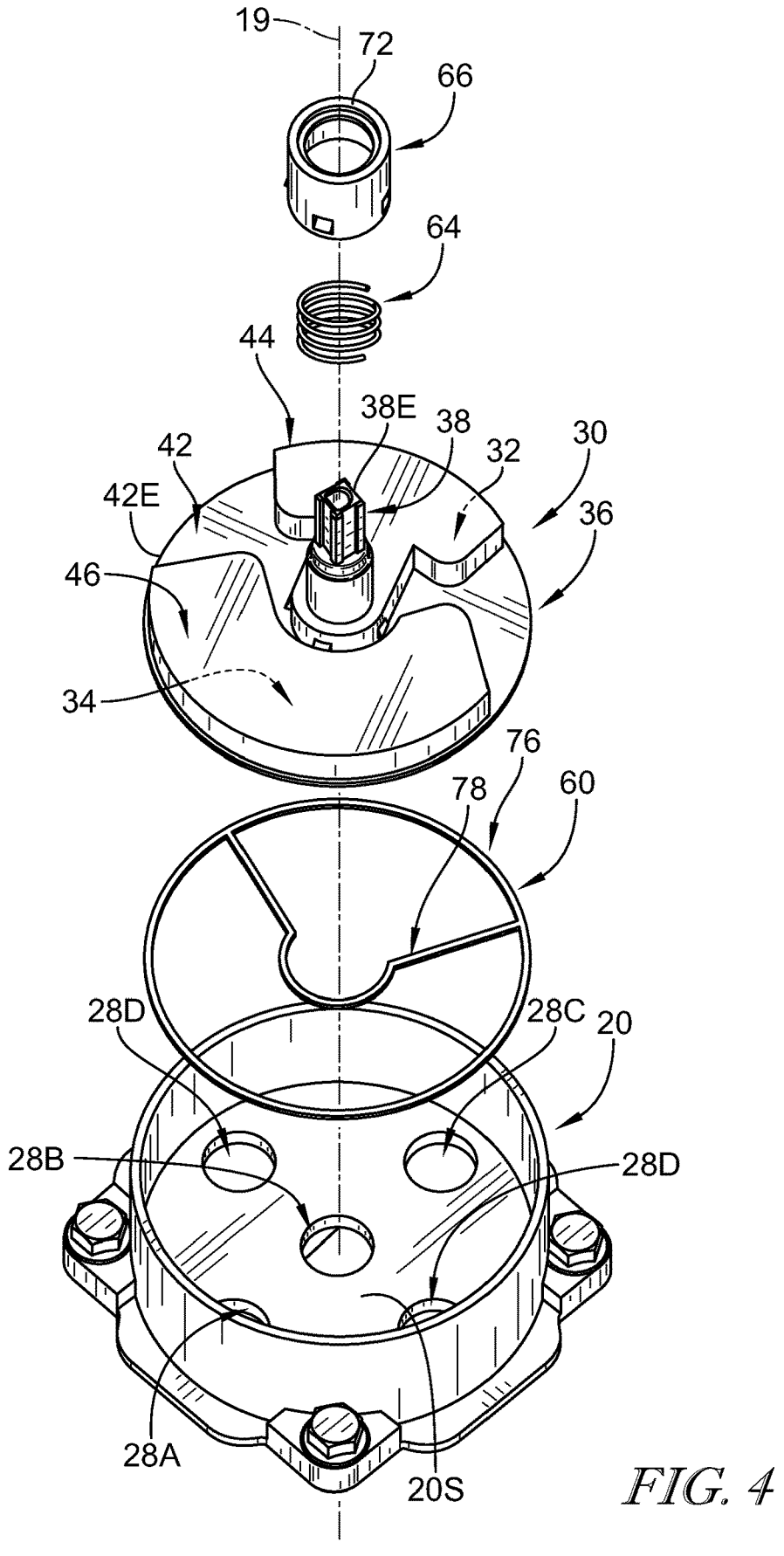

Turning again to the valve housing 12, the valve housing 12 includes a valve housing body 20 and a housing cover 22 as shown in FIGS. 2-4. The valve housing body 20 is formed to include the valve cavity 26 and a plurality of apertures 28A-E that open into the valve cavity 26. The housing cover 22 is coupled to an upper end of the valve housing body 20 to close a top opening 260 to the valve cavity 26. The valve housing body 20 includes a base 20B and a drum 20D that extends axially away from the base 20B.

Figure 5:
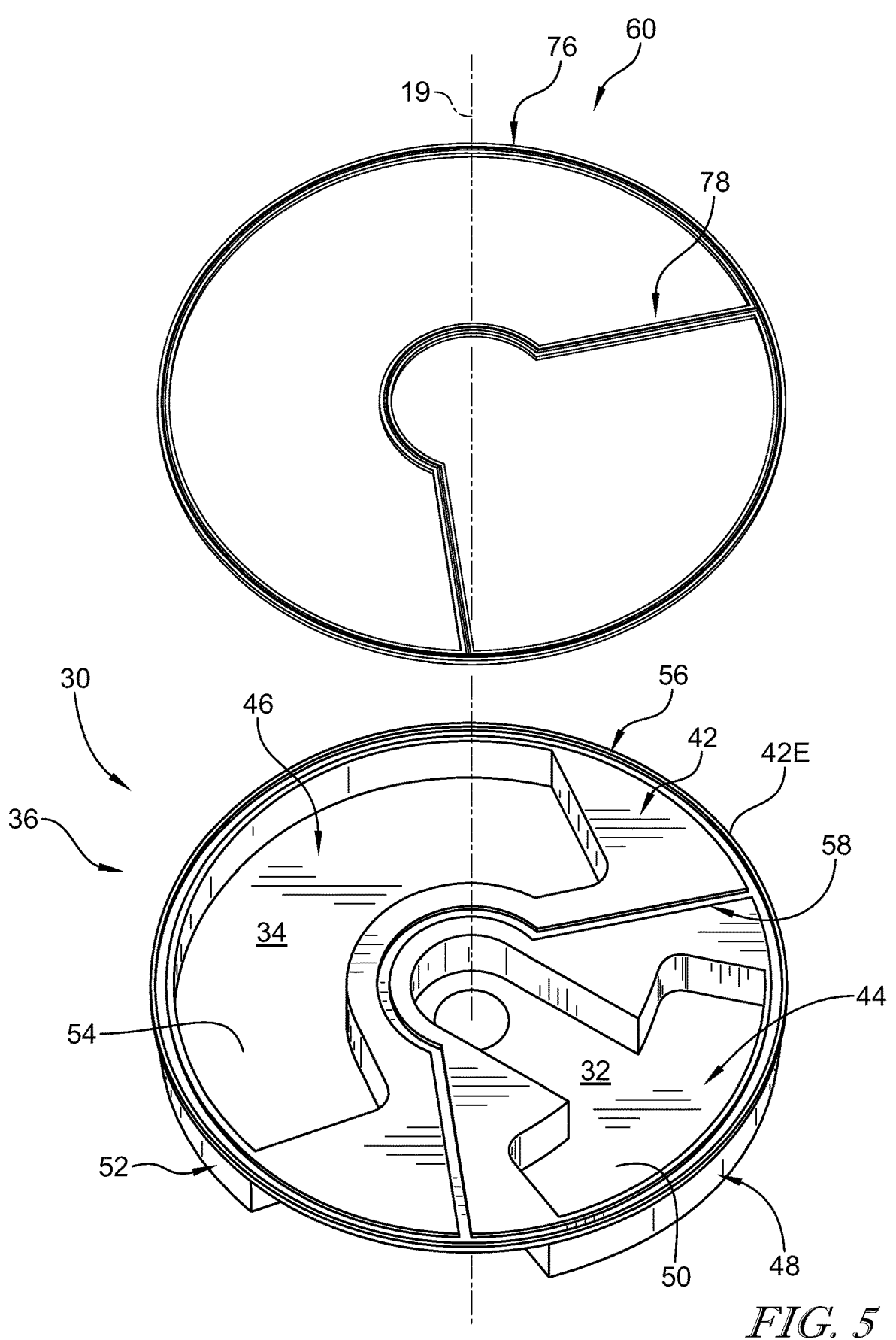
FIG. 5 is an exploded view of the valve rotor included in the valve flow controller and the seal included in the sealing system of the multi-way valve of FIG. 3.

In the illustrative embodiment, the valve housing 12 further includes a manifold gasket 17 as shown in FIGS. 2, 4, and 5. The manifold gasket 17 is located axially between the manifold and the valve housing body 20.

The valve housing body 20 is also formed to include a plurality of apertures 28A-E that open into the valve cavity 26 as shown in FIGS. 2-8. The plurality of apertures 28A-E includes a first aperture 28A, a second aperture 28B, a third aperture 28C, a fourth aperture 28D, and a fifth aperture 28E as shown in FIGS. 2-8. In the illustrative embodiment, the second aperture 28B extends axially through the valve housing body 20 at the valve axis 19. The other apertures 28A, 28C, 28D, 28E are spaced apart about the valve axis 19. In the illustrative embodiment, the first aperture 28A, the third aperture 28C, the fourth aperture 28D, and the fifth aperture 28E are spaced apart 45 degrees about the valve axis 19.

The valve flow controller 14 includes the valve rotor 30. The valve rotor 30 is arranged in the valve cavity 26 of the valve housing body 20. The valve rotor 30 is configured to rotate relative to the valve housing body 20 about the valve axis 19.

The valve rotor 30 cooperates with the valve housing 12 to define a plurality of flow paths through the valve housing body 20. As the valve rotor 30 is rotated about the valve axis 19 to different set positions, the valve rotor 30 forms different flow paths to control the flow of fluid through the housing apertures 28A-E of the valve housing body 20.

The valve rotor 30 is formed to define a first chamber 32 and a second chamber 34 as shown in FIGS. 5-8. The first chamber 32 is not in fluid communication with the second chamber 34. The valve rotor 30 controls the flow to each aperture 28A, 28B, 28C, 28D, 28E by aligning the first and second chambers 32, 34 with the different apertures 28A, 28B, 28C, 28D, 28E in the different predetermined positions. This controls which apertures 28A, 28B, 28C, 28D, 28E are in fluid communication with each other.

The valve rotor 30 includes a valve rotor body 36 and a valve rotor shaft 38 as shown in FIGS. 3-8. The valve rotor body 36 defines the first chamber 32 and the second chamber 34. The valve rotor shaft 38 extends axially from the valve rotor body 36 along the valve axis 19 and couples to the actuator 29. The valve rotor body 36 along the valve axis 19.

The valve rotor body 36 includes a valve rotor plate 42, a first flow divider member 44, and a second flow divider member 46 as shown in FIGS. 2-7. The valve rotor plate 42 extends circumferentially about the valve axis 19. The first flow divider member 44 extends axially away from the valve rotor plate 42 and defines the first chamber 32 that extends around at least two apertures 28A-E included in the plurality of apertures 28A-E that open into the valve cavity 26. The second flow divider member 46 extends axially away from the valve rotor plate 42 and defines the second chamber 34 separate from the first chamber 32 that extends around at least two different apertures 28A-E included in the plurality of apertures 28A-E that open into the valve cavity 26.

The first flow divider member 44 includes a flow divider wall 48 and an end wall 50 as shown in FIGS. 4 and 5. The flow divider wall 48 extends axially away from the valve rotor plate 42 around at least two apertures 28A-E included in the plurality of apertures 28A-E that open into the valve cavity 26. The end wall 50 closes the flow divider wall 48 to define the first chamber 32.

The second flow divider member 46 includes a flow divider wall 52 and an end wall 54 as shown in FIGS. 4 and 5. The flow divider wall 52 extends axially away from the valve rotor plate 42 around at least two apertures 28A-E included in the plurality of apertures 28A-E that open into the valve cavity 26. The end wall 54 closes the flow divider wall 52 to define the second chamber 34.

As the valve rotor body 36 rotates, the valve rotor body 36 controls the flow to each aperture 28A, 28B, 28D, 28D, 28E included in the valve housing body 20 as shown in FIGS. 9A-9E. The valve rotor body 36 controls the flow to each aperture 28A, 28B, 28D, 28D, 28E by aligning the chambers 32, 34 with the apertures 28A, 28B, 28D, 28D, 28E in the different predetermined positions.

In some positions, portions of the valve rotor plate 42 cover one of the apertures 28A, 28B, 28D, 28D, 28E to block the flow of fluid therethrough. The valve rotor plate 42 has a dead spot without chambers 32, 34. In this way, when the valve rotor 30 is in certain predetermined positions, the valve rotor plate 42 blocks flow through one of the apertures 28A, 28B, 28D, 28D, 28E.

The different modes of the multi-way valve 10 are shown in FIG. 9. The first mode or mode A is shown in FIG. 9A. The second mode or mode B is shown in FIG. 9B. The third mode or mode C is shown in FIG. 9C. The fourth mode or mode D is shown in FIG. 9D. The fifth mode or mode E is shown in FIG. 9E.

Figure 9A:
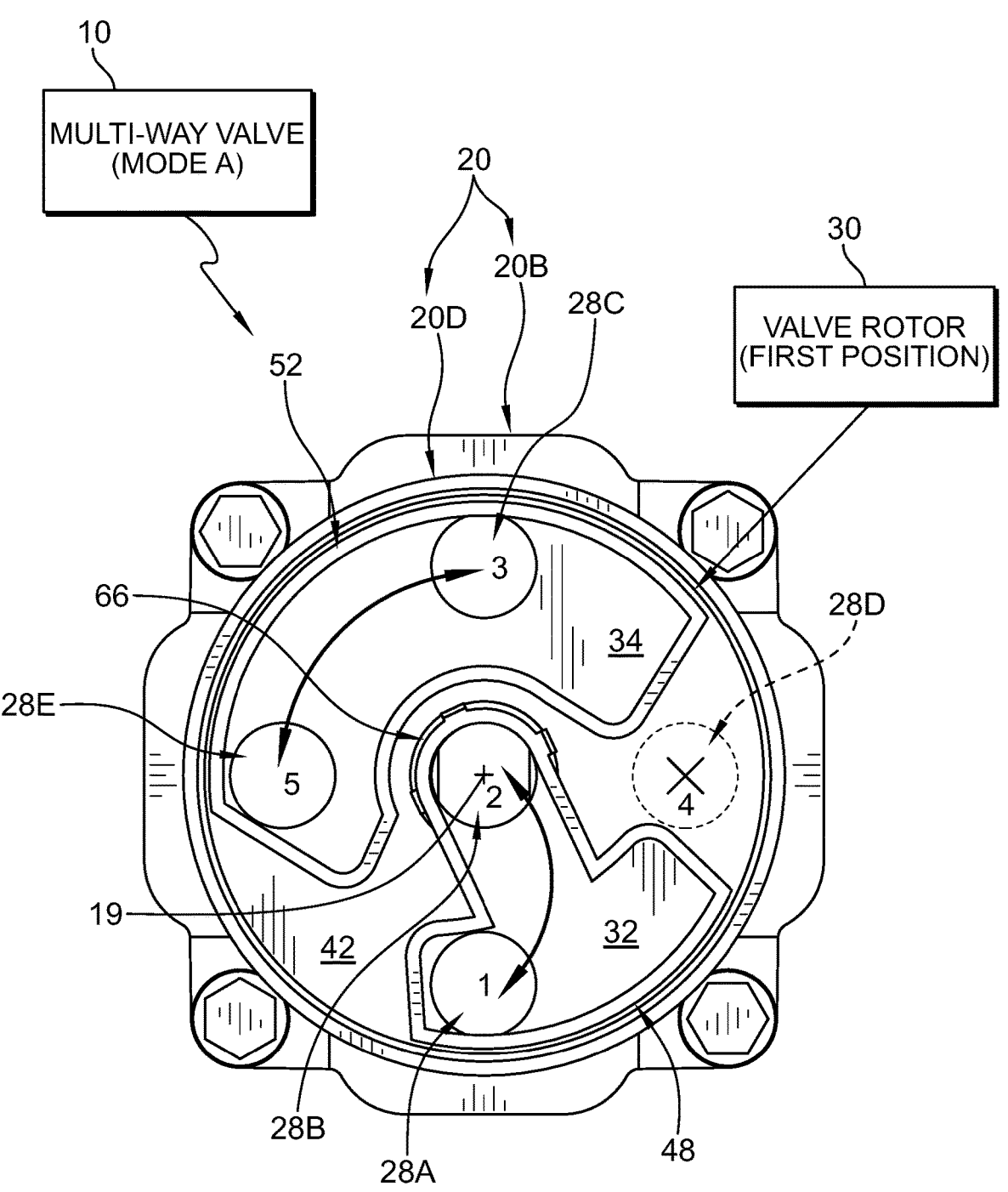
FIG. 9A is a top view of the multi-way valve in mode A as shown in FIG. 9 in which the valve rotor is in a VALVE ROTOR FIRST position.

In mode A, the valve rotor 30 is in a VALVE ROTOR FIRST position as shown in FIG. 9A. In the VALVE ROTOR FIRST position, the valve rotor body 36 connects the first aperture 28A to the second aperture 28B, connects the third aperture 28C to the fifth aperture 28E, and covers the fourth aperture 28D to form a first flow path. The first chamber 32 surrounds the first aperture 28A and the second aperture 28B so that the first aperture 28A and the second aperture 28B are in fluid communication. The second chamber 34 surrounds the third aperture 28C and the fifth aperture 28E so that the third aperture 28C and the fifth aperture 28E are in fluid communication. The fourth aperture 28D is isolated from the other apertures 28A, 28B, 28C, 28E.

Figure 9B:
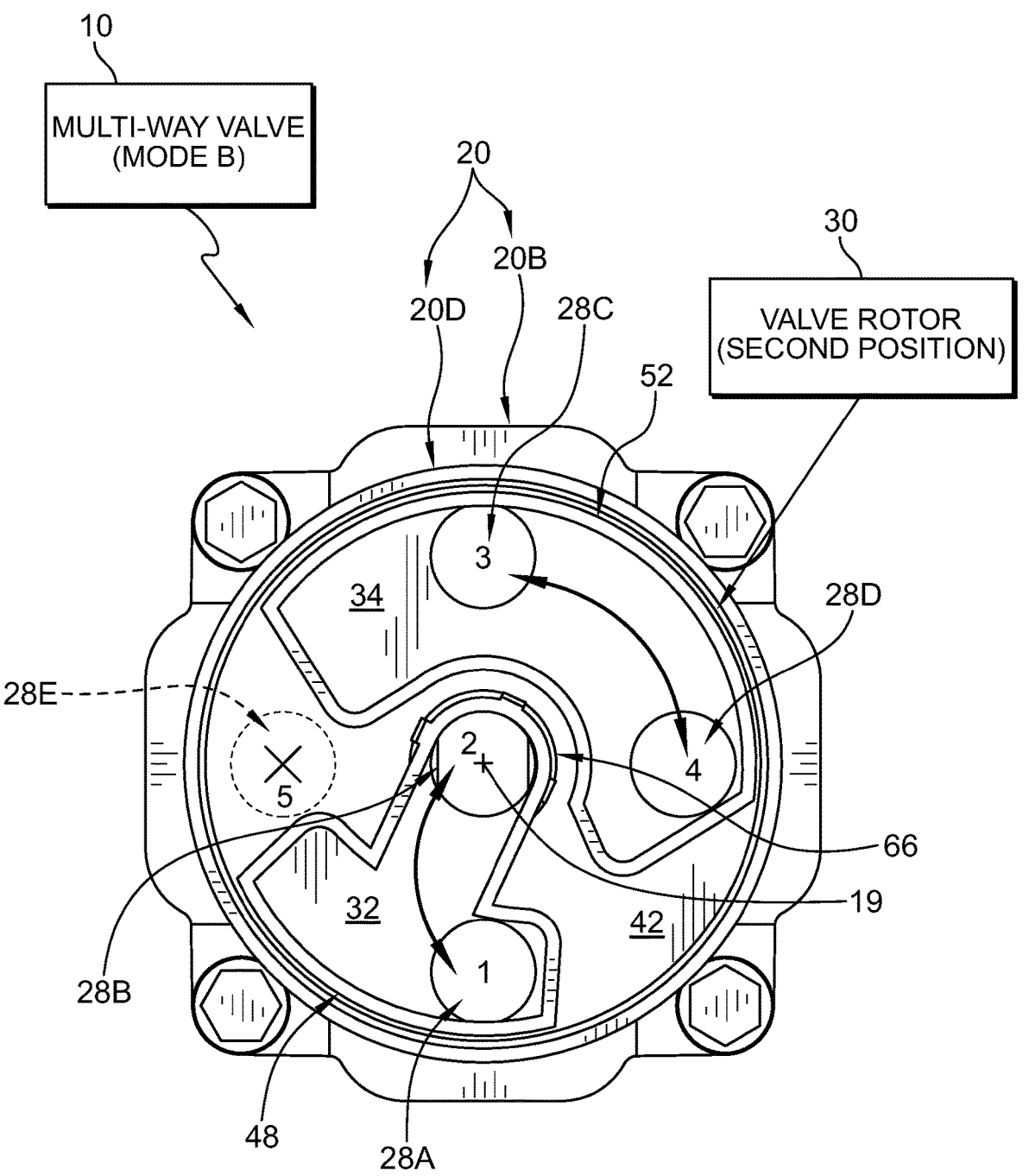
FIG. 9B is a top view of the multi-way valve in mode B as shown in FIG. 9 in which the valve rotor is in a VALVE ROTOR SECOND position.

In mode B, the valve rotor 30 is in a VALVE ROTOR SECOND position as shown in FIG. 9B. In the VALVE ROTOR SECOND position, the valve rotor body 36 connects the first aperture 28A to the second aperture 28B, connects the third aperture 28C to the fourth aperture 28D, and covers the fifth aperture 28E to form a second flow path. The first chamber 32 continues to surround the first aperture 28A and the second aperture 28B so that the first aperture 28A and the second aperture 28B are in fluid communication. The second chamber 34 surrounds the third aperture 28C and the fourth aperture 28D so that the third aperture 28C and the fourth aperture 28D are in fluid communication. The fifth aperture 28E is isolated from the other apertures 28A, 28B, 28C, 28D.

Figure 9C:
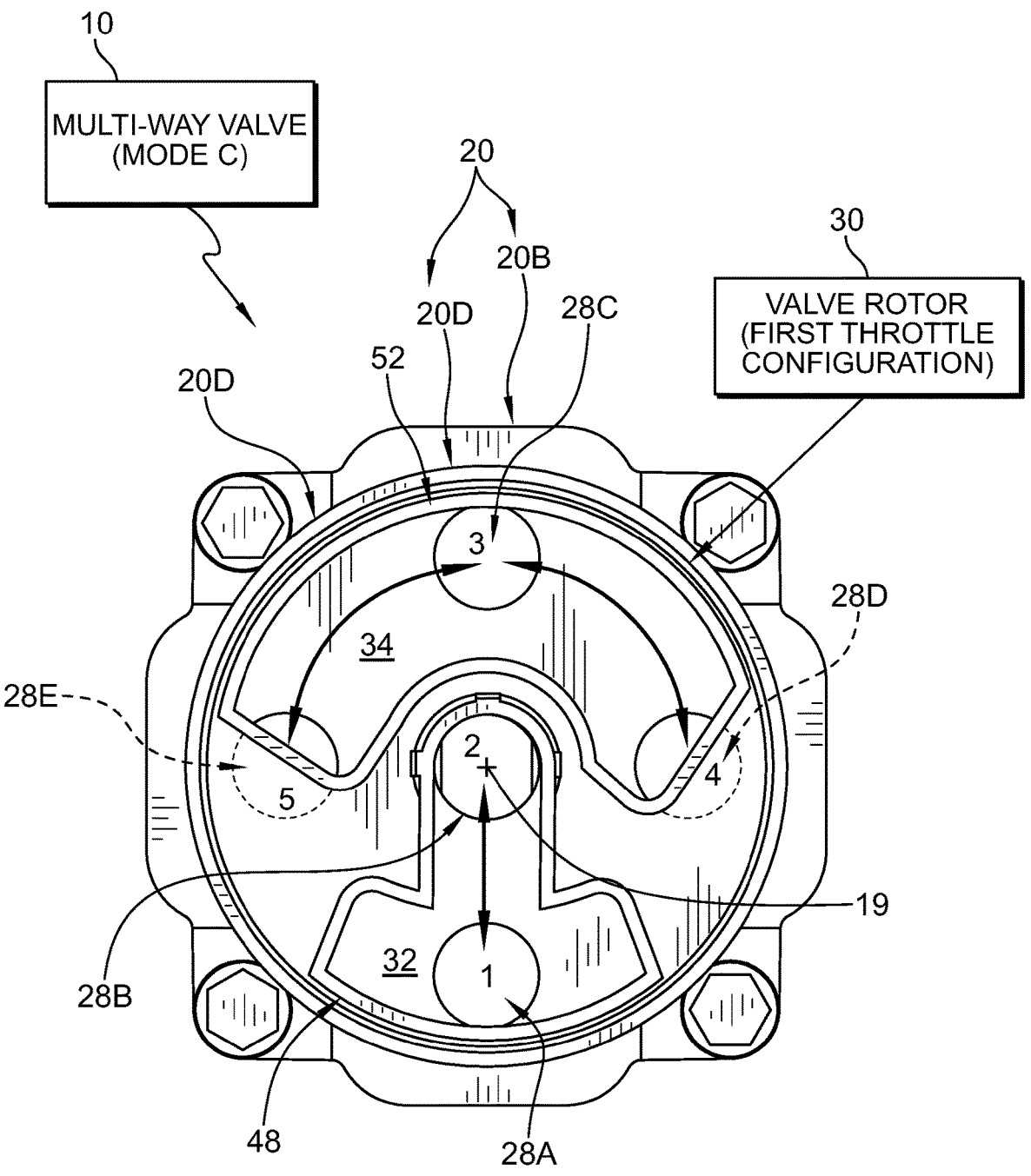
FIG. 9C is a top view of the multi-way valve in mode C as shown in FIG. 9 in which the valve rotor is in a VALVE ROTOR THIRD position or a FIRST THROTTLE configuration.

In mode C, the valve rotor 30 is in a VALVE ROTOR THIRD position or a FIRST THROTTLE configuration as shown in FIG. 9C. In the FIRST THROTTLE configuration, the valve rotor body 36 connects the first aperture 28A to the second aperture 28B and connects the third aperture 28C to the fourth and fifth apertures 28D, 28E to form a third flow path. The first chamber 32 continues to surround the first aperture 28A and the second aperture 28B so that the first aperture 28A and the second aperture 28B are in fluid communication. However, the second chamber 34 surrounds the third aperture 28C and portions of the fourth and fifth apertures 28D, 28E as shown in FIG. 9C.

The valve rotor plate 42 partially covers the fourth and fifth apertures 28D, 28E fully surrounds the third aperture 28C when the valve rotor 30 is in the FIRST THROTTLE configuration as shown in FIG. 9C. In the FIRST THROTTLE configuration, the valve rotor 30 can rotate about the valve axis 19 to vary, or throttle, the flow through the fourth and fifth apertures 28D, 28E. By rotating the valve rotor 30 in a first direction (i.e. counter-clockwise) about the valve axis 19, more of the fourth aperture 28D may be covered by the valve rotor plate 42 to decrease the flow to/from the fourth aperture 28D, while the second chamber 34 surrounds more of the fifth aperture 28E to increase the flow to/from the fifth aperture 28E. Conversely, by rotating the valve rotor 30 in the second direction opposite the first direction (i.e. clockwise) about the valve axis 19, the second chamber 34 surrounds more of the fourth aperture 28D to increase the flow to/from the fourth aperture 28D, while more of the fifth aperture 28E may be covered by the valve rotor plate 42 to decrease the flow to/from the fifth aperture 28E.

From the FIRST THROTTLE configuration, the valve rotor 30 may be rotated about the valve axis 19 to either one of the VALVE ROTOR FIRST position or the VALVE ROTOR SECOND position. If the valve rotor 30 is rotated in the first direction from the FIRST THROTTLE configuration, the valve rotor 30 returns to the VALVE ROTOR FIRST position, i.e. mode A. If the valve rotor 30 is rotated in the second direction from the FIRST THROTTLE configuration, the valve rotor 30 returns to the VALVE ROTOR SECOND position, i.e. mode B.

Figure 9D:
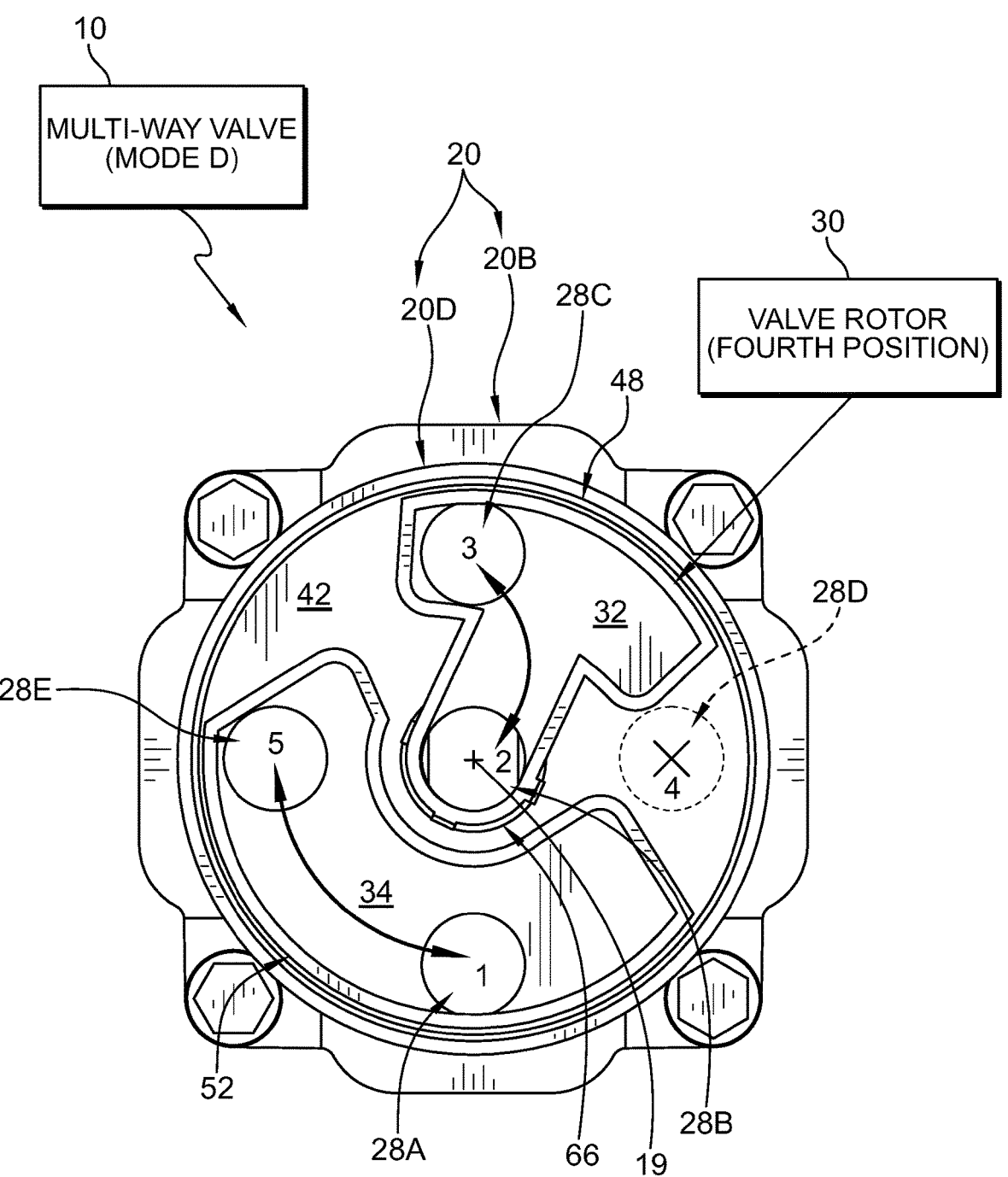
FIG. 9D is a top view of the multi-way valve in mode D as shown in FIG. 9 in which the valve rotor is in a VALVE ROTOR FOURTH position.

In mode D, the valve rotor 30 is in a VALVE ROTOR FOURTH position as shown in FIG. 9D. In the VALVE ROTOR FOURTH position, the valve rotor body 36 connects the first aperture 28A to the fifth aperture 28E, connects the third aperture 28C to the second aperture 28B, and covers the fourth aperture 28D to form a fourth flow path. The second chamber 34 surrounds the first aperture 28A and the fifth aperture 28E so that the first aperture 28A and the fifth aperture 28E are in fluid communication. The first chamber 32 surrounds the third aperture 28C and the second aperture 28B so that the third aperture 28C and the second aperture 28B are in fluid communication. The fourth aperture 28D is isolated from the other apertures 28A, 28B, 28C, 28E.

Figure 9E:
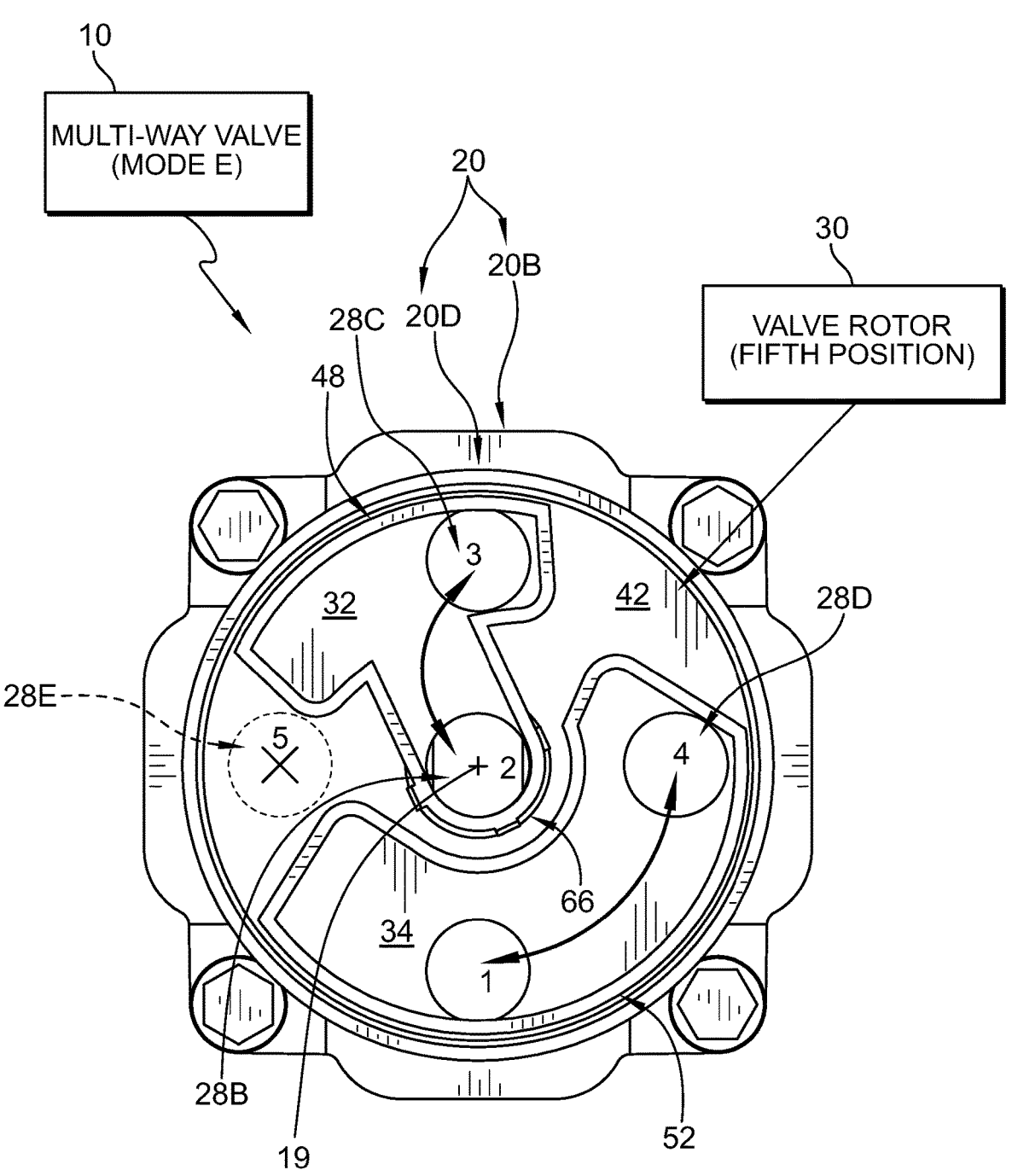
FIG. 9E is a top view of the multi-way valve in mode E as shown in FIG. 9 in which the valve rotor is in a VALVE ROTOR FIFTH position.

In mode E, the valve rotor 30 is in a VALVE ROTOR FIFTH position as shown in FIG. 9E. In the VALVE ROTOR FIFTH position, the valve rotor body 36 connects the first aperture 28A to the fourth aperture 28D, connects the third aperture 28C to the second aperture 28B, and covers the fifth aperture 28E to form a fifth flow path. The second chamber 34 surrounds the first aperture 28A and the fourth aperture 28D so that the first aperture 28A and the fourth aperture 28D are in fluid communication. The first chamber 32 continues to surround the third aperture 28C and the second aperture 28B so that the third aperture 28C and the second aperture 28B are in fluid communication. The fifth aperture 28E is isolated from the other apertures 28A, 28B, 28C, 28D.

Figure 9F:
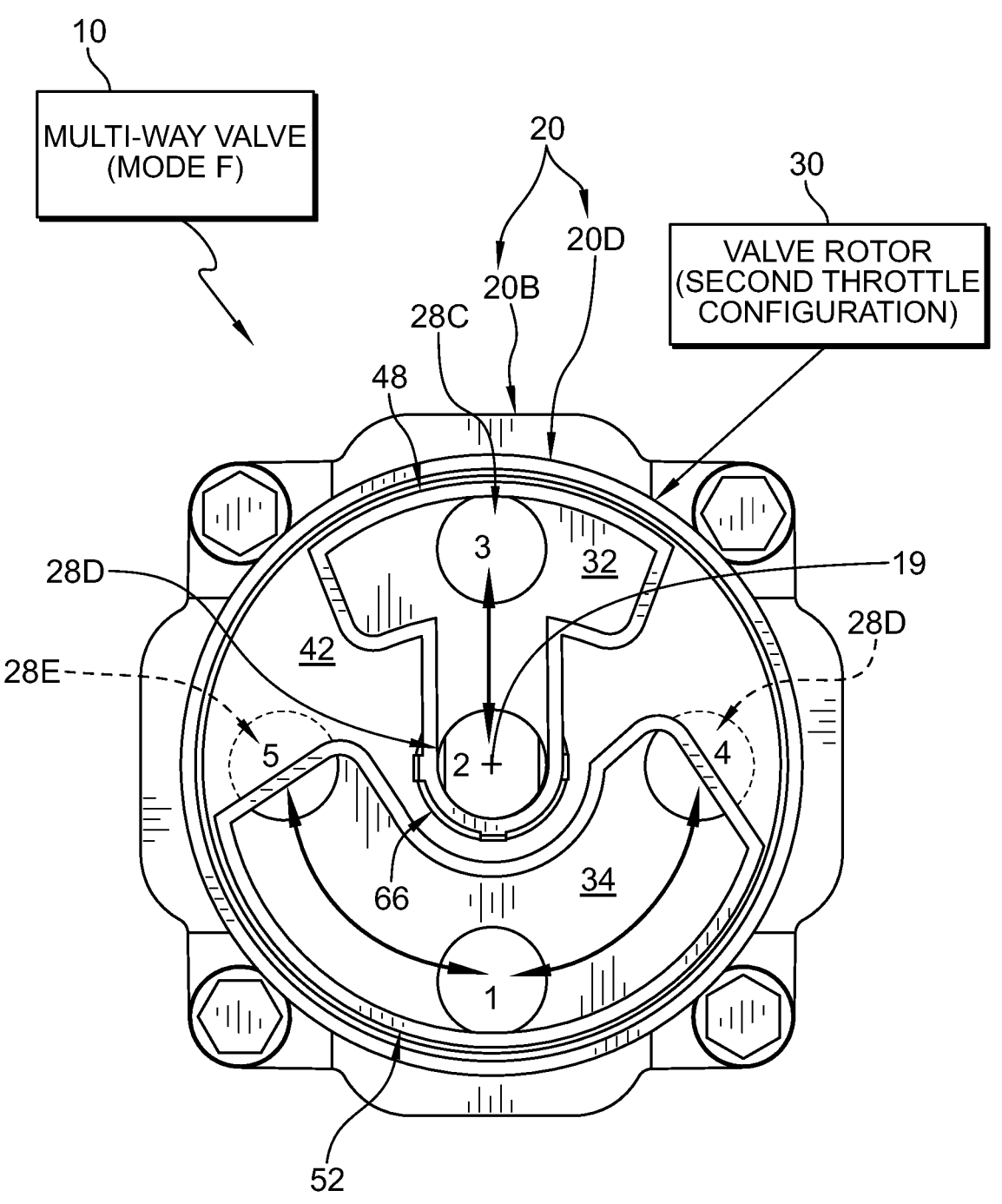
FIG. 9F is a top view of the multi-way valve in mode F as shown in FIG. 9 in which the valve rotor is in a VALVE ROTOR SIXTH position or a SECOND THROTTLE configuration.
Figure 10:
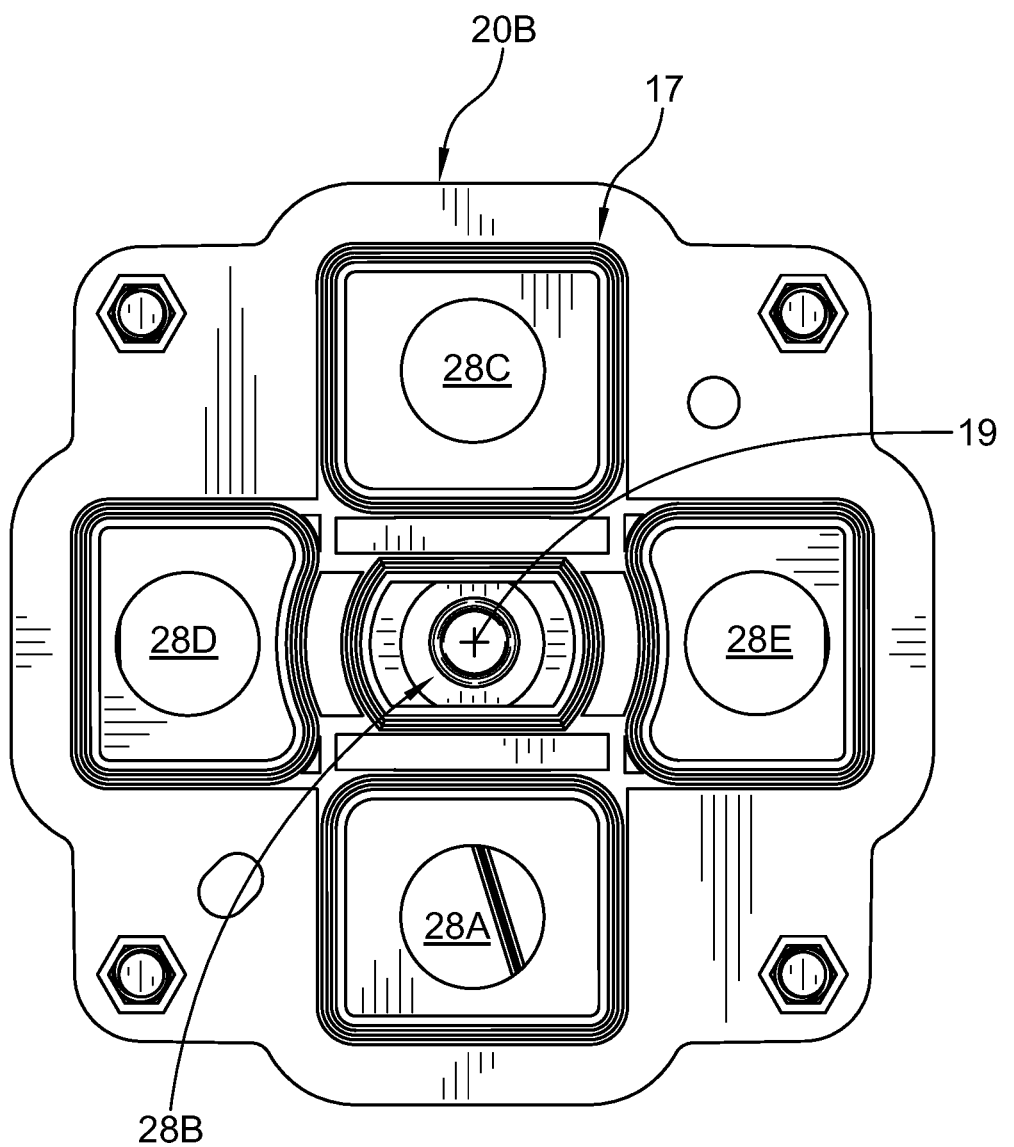
FIG. 10 is a bottom view of the multi-way valve of FIG. 1 showing the plurality of apertures in the valve housing body includes a center aperture that extends axially through the valve housing body at the valve axis and at least four outer apertures that are spaced apart circumferentially about the valve axis around the center aperture.

In mode F, the valve rotor 30 is in a VALVE ROTOR SIXTH position or a SECOND THROTTLE configuration as shown in FIG. 9F. In the SECOND THROTTLE configuration, the valve rotor body 36 connects the third aperture 28C to the second aperture 28B and connects the first aperture 28A to the fourth and fifth apertures 28D, 28E to form a sixth flow path. The first chamber 32 continues to surround the third aperture 28C and the second aperture 28B so that the third aperture 28C and the second aperture 28B are in fluid communication. However, the second chamber 34 surrounds the first aperture 28A and portions of the fourth and fifth apertures 28D, 28E as shown in FIG. 9F.

The valve rotor plate 42 partially covers the fourth and fifth apertures 28D, 28E and fully surrounds the first aperture 28A when the valve rotor 30 is in the SECOND THROTTLE configuration as shown in FIG. 9E. In the SECOND THROTTLE configuration, the valve rotor 30 can rotate about the valve axis 19 to vary, or throttle, the flow through the fourth and fifth apertures 28D, 28E. By rotating the valve rotor 30 in one direction about the valve axis 19, more of the fourth aperture 28D may be covered by the valve rotor plate 42 to decrease the flow to/from the fourth aperture 28D, while the second chamber 34 surrounds more of the fifth aperture 28E to increase the flow to/from the fifth aperture 28E. Conversely, by rotating the valve rotor 30 in the opposite direction about the valve axis 19, the second chamber 34 surrounds more of the fourth aperture 28D to increase the flow to/from the fourth aperture 28D, while more of the fifth aperture 28E may be covered by the valve rotor plate 42 to decrease the flow to/from the fifth aperture 28E.

From the SECOND THROTTLE configuration, the valve rotor 30 may be rotated about the valve axis 19 to either one of the VALVE ROTOR FOURTH position or the VALVE ROTOR FIFTH position. If the valve rotor 30 is rotated in the first direction from the SECOND THROTTLE configuration, the valve rotor 30 returns to the VALVE ROTOR FIFTH position, i.e. mode E. If the valve rotor 30 is rotated in the second direction from the SECOND THROTTLE configuration, the valve rotor 30 returns to the VALVE ROTOR FOURTH position, i.e. mode D.

The multi-way valve 10 and/or each of the actuator 29 may include the control unit configured to direct the actuator 29 to move the valve rotor 30 to the different predetermined positions in each of the different modes A-E. Based on where the vehicle needs fluid, the control unit would direct the actuator 29 to move the valve rotor 30 to one of the positions for the desired mode.

The sealing system 16 includes a seal 60 and a biasing assembly 62 as shown in FIGS. 2-8. The seal 60 is coupled to the valve rotor 30 for rotation therewith between the different predetermined positions. The biasing assembly 62 is configured to selectively apply an axial force F on the valve rotor 30 to urge the valve rotor 30 and the seal 60 toward the valve housing body 20 when the valve rotor 30 is in one of the plurality of different predetermined positions so as to increase sealing between the valve rotor 30 and the valve housing body 20.

The biasing assembly 62 is configured to selectively apply an axial force F on the valve rotor 30 to urge the valve rotor 30 and the seal 60 toward a bottom surface 20S of the valve housing body 20 when the valve rotor 30 is in one of the different predetermined positions in each of the modes A-E to improve sealing between the valve rotor 30 and the valve housing body 20. The biasing assembly 62 selectively applies the axial force F to increase friction between the seal 60 on the valve rotor 30 and the valve housing body 20 at the different predetermined positions, but removes at least a portion of the axial force F when the valve rotor 30 rotates to reduce the friction between the seal 60 on the valve rotor 30 and the valve housing body 20. In this way, the torque needed to rotate the valve rotor 30 is reduced and the wear on the seal 60 is reduced.

In other multi-way seals, large amounts of Teflon® or polytetrafluoroethylene material may be used to seal the different passages, which can make manufacturing the multi-way valve expensive. Therefore, by reducing the amount of friction on the seal 60 during rotation of the valve rotor 30, wear on the seal 60 is reduced. This reduces the need to replace the seal 60 as well and reduces the cost of repairing the multi-way valve 10. Moreover, the amount of Teflon® or polytetrafluoroethylene material used is significantly reduced compared to other multi-way valves.

In the illustrative embodiment, the seal 60 comprises a polytetrafluoroethylene material. In other embodiments, the seal may be made of another suitable material.

Figures 6, 7:
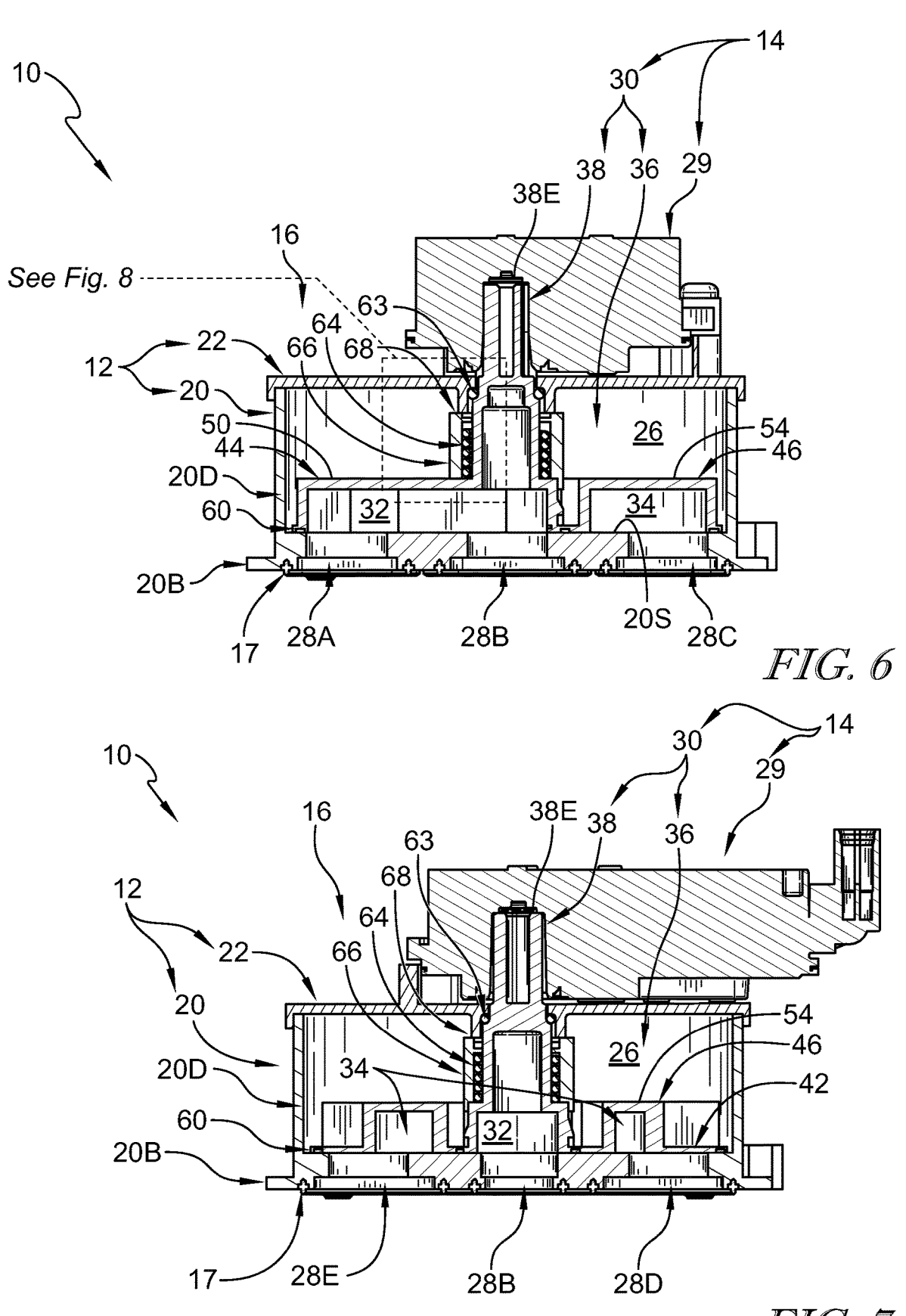
FIG. 6 is a cross-section view of the multi-way valve of FIG. 1 showing the valve rotor body is shaped to define chambers that extend over the different apertures to fluidly connect the different apertures at the different predetermined positions.
FIG. 7 is a cross-section view of the multi-way valve of FIG. 1 showing the valve rotor body may at least partially cover different apertures at the different predetermined positions.
Figure 8:
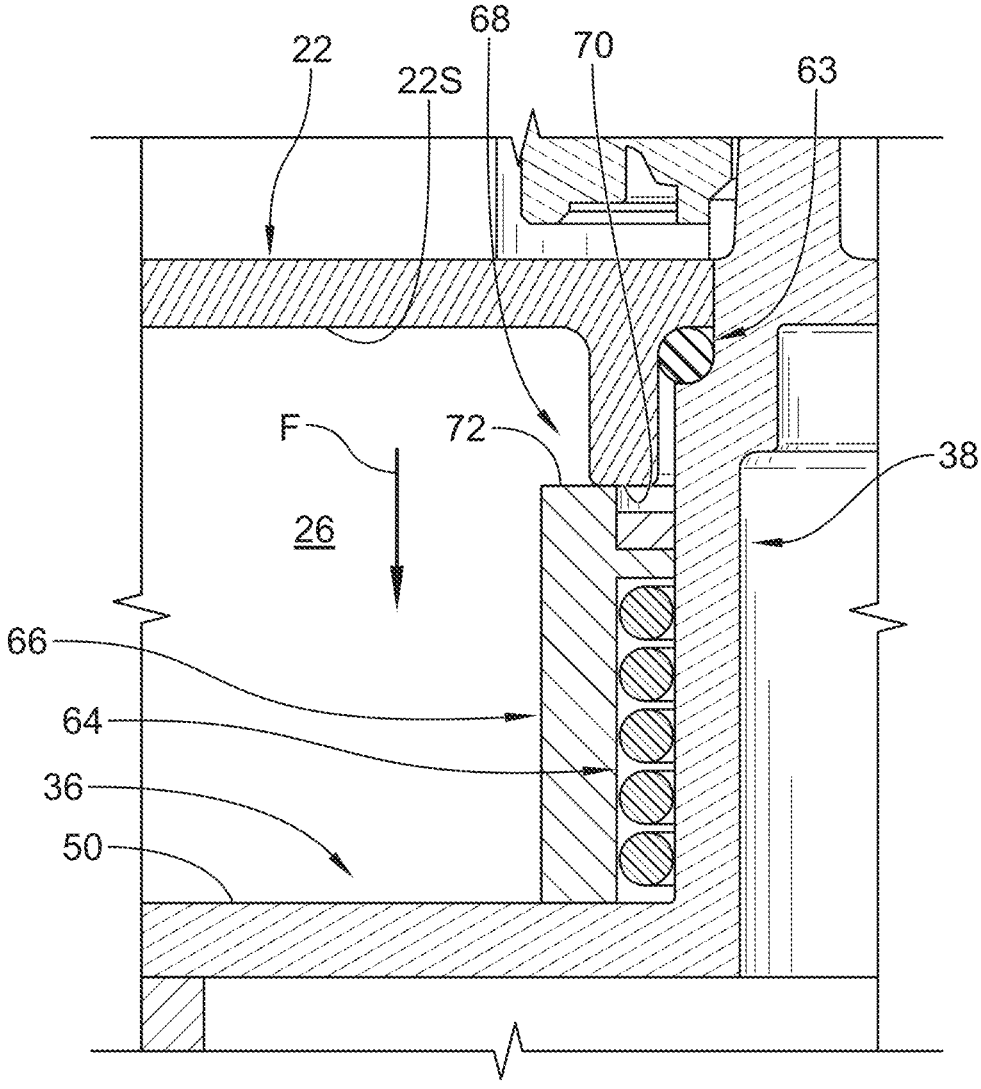
FIG. 8 is a detail view of FIG. 6 showing the biasing assembly includes a bias spring arranged around the valve rotor shaft so as to apply at least a portion of the axial force on the valve rotor and a spring cover that extends around the bias spring.

The biasing assembly 62 includes a bias spring 64 and a spring cover 66 as shown in FIGS. 3-8. The bias spring 64 is arranged around the valve rotor shaft 38 of the valve rotor 30. The bias spring 64 is configured to apply at least a portion of the axial force F on the valve rotor 30 to urge the seal 60 fixed to the valve rotor 30 toward the bottom surface 20S of the valve housing body 20. The spring cover 66 extends around the bias spring 64 and couples to the valve rotor 30 for rotation therewith. In this way, the bias spring 64 is located between the spring cover 66 and the valve rotor 30 as shown in FIGS. 6 and 7.

In the some embodiments, the bias spring 64 is configured to apply the axial force F on the valve rotor 30 to urge the seal 60 fixed to the valve rotor 30 toward the bottom surface 20S of the valve housing body 20. In illustrative embodiment, the bias spring 64 applies part of the axial force F to the valve rotor 30, i.e. a baseline force to the valve rotor 30 to provide at least some sealing between the valve rotor 30 and the valve housing body 20. The bias assembly 62 further includes cam means 68, 70 to increase the amount of axial force F applied to the valve rotor 30 at the different predetermined positions. The cam means 68 may be used in conjunction with or instead of the bias spring 64 to apply the axial force F to the valve rotor.

The cam means 68 includes cam ramps 70 formed on an axially facing surface 22S of the housing cover 22 of the valve housing 12 and a cam surface 72 on the spring cover 66. The cam surface 72 is configured to engage the cam ramps 70 on the housing cover 22 as the valve rotor 30 rotates about the valve axis 19 to the plurality of different predetermined positions.

The cam surface 72 is formed on an axially facing surface of the spring cover 66 as shown in FIGS. 6 and 7. The cam surface 72 may be raised at about 90-degree intervals around the valve axis 19. Each of the apertures 28A, 28C, 28D, 28E are spaced apart circumferentially about the valve axis 19 at 90-degree intervals as shown in FIG. 4. In this way, the axial force F will be applied at the different predetermined positions so as to seal around the corresponding apertures.

The cam ramps 70 on the housing cover 22 are each circumferentially aligned with one aperture 28A, 28C, 28D, 28E formed in the valve housing body 20 of the valve housing 12. In this way, the raised portions of the cam surface 72 engages one of the cam ramps 70 in each of the different predetermined positions to cause the axial force F to be applied to the valve rotor 30. Then as the valve rotor 30 rotates about the valve axis 19, the raised portions of the cam surface 72 disengage the cam ramps 70 so that at least a portion of the axial force F is removed and the torque needed to rotate the valve rotor 30 is reduced.

The cam ramps 70 are fixed on the housing cover 22. The cam surface 72 on the spring cover 66 rides against the cam ramps 70 in a circular manner and applies downward axial force F to the valve rotor 30 when aligned with the high point of the cam surface 72. This force F generates a contact pressure between the seal 60 with the bottom surface 20S of the valve housing body 20. The increased contact pressure and resulting increase in friction are only generated in the predetermined positions of the different modes A-F. This reduces friction and torque on the actuator during movement between seal points.

The seal 60 of the sealing system 16 includes an outer ring 76 and a dividing member 78 as shown in FIGS. 3-5. The outer ring 76 extends circumferentially about the valve axis 19 at an outer edge 38E of the valve housing body 20. The dividing member 78 extends between opposite sides of the outer ring 76.

Another embodiment of a multi-way valve 210 in accordance with the present disclosure is shown in FIGS. 11-15. The multi-way valve 210 is substantially similar to the multi-way valve 10 shown in FIGS. 1-10 and described herein. Accordingly, similar reference numbers in the 200 series indicate features that are common between the multi-way valve 10 and the multi-way valve 210. The description of the multi-way valve 10 is incorporated by reference to apply to the multi-way valve 210, except in instances when it conflicts with the specific description and the drawings of the multi-way valve 210.

The multi-way valve 210 includes a valve housing 212, a valve flow controller 214, and a sealing system 216. The valve flow controller 214 is arranged in the valve housing 212 to control flow through the valve housing 212. The sealing system 216 is configured to seal between the valve housing 212 and the valve flow controller 214.

In the illustrative embodiment, the spring cover 266 included in the sealing system 216 has a different shape compared to the spring cover 66 in the embodiments of FIGS. 1-10. The spring cover 266 is coupled to the valve rotor 230.

In the illustrative embodiment, the strength of the spring 64, 264 may be altered depending on the baseline force to be applied to the valve rotor 30, 230. For example, if a greater baseline force is needed, the spring 64, 264 may have a greater spring constant. However, if a lesser baseline force is needed, the spring 64, 264 may have a lower spring constant. Depending on the chosen spring 64, 264, the spring cover 66, 266 may be altered to fit the size of the spring 64, 264. This allows a different spring to be used without altering different components of the valve 10 and limits the amount of redesign needed.

The valve housing 212 includes a valve housing body 220 and a housing cover 222 as shown in FIGS. 11 and 12. The valve housing body 220 is formed to include the valve cavity 226 and a plurality of apertures 228A-E that open into the valve cavity 226. The housing cover 222 is coupled to an upper end of the valve housing body 220.

The valve housing body 220 is also formed to include a plurality of apertures 228A-E that open into the valve cavity 226 as shown in FIGS. 13 and 14. The plurality of apertures 228A-E includes a first aperture 228A, a second aperture 228B, a third aperture 228C, a fourth aperture 228D, and a fifth aperture 228E.

The valve flow controller 214 includes the valve rotor 230. The valve rotor 230 is arranged in the valve cavity 226 of the valve housing body 220. The valve rotor 230 is configured to rotate relative to the valve housing body 220 about the valve axis 19.

The valve rotor 230 cooperates with the valve housing 212 to define a plurality of flow paths through the valve housing body 220. As the valve rotor 230 is rotated about the valve axis 19 to different set positions, the valve rotor 230 forms different flow paths to control the flow of fluid through the housing apertures 228A-E of the valve housing body 220.

The valve rotor 230 is formed to define a first chamber 232 and a second chamber 234 as shown in FIGS. 12-14. The first chamber 232 is not in fluid communication with the second chamber 234.

The valve rotor 230 includes a valve rotor body 236 and a valve rotor shaft 238 as shown in FIGS. 12-14. The valve rotor body 236 defines the first chamber 232 and the second chamber 234. The valve rotor shaft 238 extends axially from the valve rotor body 236 along the valve axis 19 and couples to the actuator 229. The valve rotor body 236 along the valve axis 19.

The valve rotor body 36 includes a valve rotor plate 242, a first flow divider member 244, and a second flow divider member 246 as shown in FIGS. 13 and 14. The valve rotor plate 242 extends circumferentially about the valve axis 19. The first flow divider member 244 extends axially away from the valve rotor plate 242 to an end wall 250 and defines the first chamber 232 that extends around at least two apertures 228A-E included in the plurality of apertures 228A-E that open into the valve cavity 226. The second flow divider member 246 extends axially away from the valve rotor plate 242 to an end wall 254 and defines the second chamber 234 separate from the first chamber 232 that extends around at least two different apertures 228A-E included in the plurality of apertures 228A-E that open into the valve cavity 226.

The sealing system 216 includes a seal 260 and a biasing assembly 262 as shown in FIGS. 12-14. The seal 260 is coupled to the valve rotor 230 for rotation therewith between the different predetermined positions. The biasing assembly 262 is configured to selectively apply an axial force F on the valve rotor 230 to urge the valve rotor 230 and the seal 260 toward the valve housing body 220 when the valve rotor 230 is in one of the plurality of different predetermined positions so as to increase sealing between the valve rotor 230 and the valve housing body 220.

The biasing assembly 262 includes a bias spring 264 and a spring cover 266 as shown in FIGS. 12-14. The bias spring 264 is arranged around the valve rotor shaft 238 of the valve rotor 230. The bias spring 264 is configured to apply at least a portion of the axial force F on the valve rotor 230 to urge the seal 260 fixed to the valve rotor 230 toward the bottom surface of the valve housing body 220. The spring cover 266 extends around the bias spring 264 and couples to the valve rotor 230 for rotation therewith. In this way, the bias spring 264 is located between the spring cover 266 and the valve rotor 30.

The bias assembly 262 further includes cam means 268 to increase the amount of axial force F applied to the valve rotor 230 at the different predetermined positions. The cam means 268 may be used in conjunction with or instead of the bias spring 264 to apply the axial force F to the valve rotor.

The cam means 268 includes cam ramps 270 formed on an axially facing surface of the housing cover 222 of the valve housing 212 and a cam surface 272 on the spring cover 266 as shown in FIG. 15. The cam surface 272 is configured to engage the cam ramps 270 on the housing cover 222 as the valve rotor 230 rotates about the valve axis 19 to the plurality of different predetermined positions.

The invention claimed is:

1. A multi-way valve comprising a valve housing coupled to a manifold of thermal fluid circuits, the valve housing including a valve housing body and a housing cover coupled to the valve housing body, the valve housing body shaped to define a valve cavity and a plurality of apertures that open into the valve cavity, and the housing cover coupled to the valve housing to close a top opening to the valve cavity, and a valve flow controller including a valve rotor arranged in the valve cavity of the valve housing body and configured to rotate relative to the valve housing body about a valve axis and an actuator coupled to the valve rotor to drive rotation of the valve rotor about the valve axis, wherein the valve rotor cooperates with the valve housing to define a plurality of flow paths when the valve rotor is rotated about the valve axis to a plurality of different predetermined positions to control a flow of fluid through the valve housing, and a sealing system configured to seal between the valve rotor and the valve housing in the valve cavity, the sealing system including a seal coupled to the valve rotor for rotation therewith and arranged axially between the valve flow rotor and a bottom surface of the valve housing and a biasing assembly configured to selectively apply an axial force on the valve rotor to urge the valve rotor toward the plurality of apertures formed in the valve housing body when the valve rotor is in one of the plurality of different predetermined positions to increase sealing between the valve rotor and the valve housing, wherein the plurality of apertures formed in the valve housing body include a center aperture that extends axially through the valve housing body at the valve axis and four outer apertures that are spaced apart circumferentially about the valve axis around the center aperture.

2. The multi-way valve of claim 1, wherein the biasing assembly includes a bias spring arranged around a valve rotor shaft of the valve rotor and configured to apply at least a portion of the axial force on the valve rotor to urge the valve rotor toward the plurality of apertures formed in the valve housing body and a spring cover that extends around the bias spring and couples to the valve rotor.

3. The multi-way valve of claim 2, wherein the biasing assembly further includes cam ramps on an axially facing surface of the housing cover of the valve housing and a cam surface on the spring cover configured to engage the cam ramps on the housing cover as the valve rotor rotates about the valve axis to the plurality of different predetermined positions.

4. The multi-way valve of claim 1, wherein the biasing assembly includes cam ramps on an axially facing surface of the housing cover of the valve housing and a cam surface on the spring configured to engage the cam ramps on the housing cover as the valve rotor rotates about the valve axis to the plurality of different predetermined positions.

5. The multi-way valve of claim 1, wherein the seal comprises polytetrafluoroethylene material.

6. The multi-way valve of claim 1, wherein the valve rotor includes a valve rotor body that extends circumferentially about the valve axis and a valve rotor shaft that extends axially from the valve rotor body through the housing cover of the valve housing to a terminal end located outside of the housing cover of the valve housing and coupled to the actuator.

7. The multi-way valve of claim 6, wherein the valve rotor body is shaped to define a first chamber that extends around at least two apertures included in the plurality of apertures that open into the valve cavity and a second chamber separate from the first chamber that extends around at least two different apertures included in the plurality of apertures that open into the valve cavity.

8. The multi-way valve of claim 6, wherein the valve rotor body includes a valve rotor plate that extends circumferentially about the valve axis, a first flow divider member that extends axially away from the valve rotor plate and defines a first chamber that extends around at least two apertures included in the plurality of apertures that open into the valve cavity, and a second flow divider member that extends axially away from the valve rotor plate and defines a second chamber separate from the first chamber that extends around at least two different apertures included in the plurality of apertures that open into the valve cavity.

9. A multi-way valve comprising a valve housing coupled to a manifold of thermal fluid circuits, the valve housing including a valve housing body and a housing cover coupled to the valve housing body, the valve housing body shaped to define a valve cavity and a plurality of apertures that open into the valve cavity, and the housing cover coupled to the valve housing to close a top opening to the valve cavity, and a valve flow controller including a valve rotor arranged in the valve cavity of the valve housing body and configured to rotate relative to the valve housing body about a valve axis and an actuator coupled to the valve rotor to drive rotation of the valve rotor about the valve axis, wherein the valve rotor cooperates with the valve housing to define a plurality of flow paths when the valve rotor is rotated about the valve axis to a plurality of different predetermined positions to control a flow of fluid through the valve housing, and a sealing system configured to seal between the valve rotor and the valve housing in the valve cavity, the sealing system including a seal coupled to the valve rotor for rotation therewith and arranged axially between the valve flow rotor and a bottom surface of the valve housing and a biasing assembly configured to selectively apply an axial force on the valve rotor to urge the valve rotor toward the plurality of apertures formed in the valve housing body when the valve rotor is in one of the plurality of different predetermined positions to increase sealing between the valve rotor and the valve housing, wherein the seal of the sealing system includes an outer ring that extends circumferentially about the valve axis at an outer edge of the valve housing body and a dividing member that extends between opposite sides of the outer ring.

10. The multi-way valve of claim 9, wherein the plurality of apertures formed in the valve housing body include a center aperture that extends axially through the valve housing body at the valve axis and four outer apertures that are spaced apart circumferentially about the valve axis around the center aperture.

11. A multi-way valve comprising a valve housing that extends axially along a valve axis, the valve housing formed to include a valve cavity and a plurality of apertures that open into the valve cavity, a valve flow controller including a valve rotor arranged in the valve cavity of the valve housing and configured to rotate relative to the valve housing about a valve axis and an actuator coupled to the valve rotor to drive rotation of the valve rotor about the valve axis, wherein the valve rotor cooperates with the valve housing to define a plurality of flow paths when the valve rotor is rotated about the valve axis to a plurality of different predetermined positions to control a flow of fluid through the valve housing, and a sealing system configured to seal between the valve rotor and the valve housing in the valve cavity, the sealing system including a seal coupled to the valve rotor for rotation therewith and arranged axially between the valve flow rotor and a bottom surface of the valve housing and biasing means for applying an axial force on the valve rotor to urge the seal into engagement with the bottom surface of the valve housing when the valve rotor is in one of the plurality of different predetermined positions to improve sealing between the valve rotor and the valve housing and for removing at least some of the axial force on the valve rotor to reduce friction between the seal and the valve housing when the valve rotor is rotated about the valve axis from one position to another position included in the plurality of different predetermined positions, wherein the valve housing includes a valve housing body and a housing cover coupled to the valve housing body, the valve housing body shaped to define the valve cavity and the plurality of apertures that open into the valve cavity, and the housing cover coupled to the valve housing to close a top opening to the valve cavity, and wherein the plurality of apertures formed in the valve housing body include a center aperture that extends axially through the valve housing body at the valve axis and four outer apertures that are spaced apart circumferentially about the valve axis around the center aperture.

12. The multi-way valve of claim 11, wherein the biasing means includes a bias spring arranged around a valve rotor shaft of the valve rotor and configured to apply at least a portion of the axial force on the valve rotor to urge the valve rotor toward the plurality of apertures formed in the valve housing body and a spring cover that extends around the bias spring and couples to the valve rotor.

13. The multi-way valve of claim 12, wherein the biasing means further includes cam ramps on an axially facing surface of the housing cover of the valve housing and a cam surface on the spring cover configured to engage the cam ramps on the housing cover as the valve rotor rotates about the valve axis to the plurality of different predetermined positions.

14. The multi-way valve of claim 11, wherein the biasing means includes cam ramps on an axially facing surface of the housing cover of the valve housing and a cam surface on the spring rotor configured to engage the cam ramps on the housing cover as the valve rotor rotates about the valve axis to the plurality of different predetermined positions.

15. The multi-way valve of claim 11, wherein the seal comprises polytetrafluoroethylene material.

16. The multi-way valve of claim 11, wherein the valve rotor includes a valve rotor body that extends circumferentially about the valve axis and a valve rotor shaft that extends axially from the valve rotor body through the housing cover of the valve housing to a terminal end located outside of the housing cover of the valve housing and coupled to the actuator.

17. The multi-way valve of claim 16, wherein the valve rotor body is shaped to define a first chamber that extends around at least two apertures included in the plurality of apertures that open into the valve cavity and a second chamber separate from the first chamber that extends around at least two different apertures included in the plurality of apertures that open into the valve cavity.

18. The multi-way valve of claim 16, wherein the valve rotor body includes a valve rotor plate that extends circumferentially about the valve axis, a first flow divider member that extends axially away from the valve rotor plate and defines a first chamber that extends around at least two apertures included in the plurality of apertures that open into the valve cavity, and a second flow divider member that extends axially away from the valve rotor plate and defines a second chamber separate from the first chamber that extends around at least two different apertures included in the plurality of apertures that open into the valve cavity.

* * * * *